US011854207B2

United States Patent
Zhang et al.

(10) Patent No.: US 11,854,207 B2
(45) Date of Patent: Dec. 26, 2023

(54) POINT CLOUD SEGMENTATION METHOD AND DEVICE, AND COMPUTER READABLE STORAGE MEDIUM

(71) Applicant: GUANGDONG OPPO MOBILE TELECOMMUNICATIONS CORP., LTD., Guangdong (CN)

(72) Inventors: Wei Zhang, Dongguan (CN); Fuzheng Yang, Dongguan (CN); Shuai Wan, Dongguan (CN); Yanzhuo Ma, Dongguan (CN); Junyan Huo, Dongguan (CN); Sujun Zhang, Dongguan (CN); Zexing Sun, Dongguan (CN)

(73) Assignee: GUANGDONG OPPO MOBILE TELECOMMUNICATIONS CORP., LTD., Guangdong (CN)

( * ) Notice: Subject to any disclaimer, the term of this patent is extended or adjusted under 35 U.S.C. 154(b) by 84 days.

(21) Appl. No.: 17/646,529

(22) Filed: Dec. 30, 2021

(65) Prior Publication Data

US 2022/0122265 A1 Apr. 21, 2022

Related U.S. Application Data

(63) Continuation of application No. PCT/CN2019/094287, filed on Jul. 1, 2019.

(51) Int. Cl.
*G06T 7/12* (2017.01)

(52) U.S. Cl.
CPC ...... *G06T 7/12* (2017.01); *G06T 2207/10028* (2013.01)

(58) Field of Classification Search
None
See application file for complete search history.

(56) References Cited

U.S. PATENT DOCUMENTS

| 2016/0239518 A1* | 8/2016 | Roimela | G06F 16/583 |
| 2019/0130525 A1 | 5/2019 | Mou | |
| 2020/0182626 A1* | 6/2020 | He | G06T 7/11 |

FOREIGN PATENT DOCUMENTS

| CN | 105205441 A | 12/2015 |
| CN | 105631920 A | 6/2016 |
| CN | 108322742 A | 7/2018 |

(Continued)

OTHER PUBLICATIONS

3DG "G-PCC Codec Description v4" ISO/IEC JTC1/SC29/WG11 N18673; Jul. 2019; Gothenburg, SE. 62 pages.

(Continued)

*Primary Examiner* — Frank S Chen
(74) *Attorney, Agent, or Firm* — PERKINS COIE LLP

(57) ABSTRACT

The implementation of the present disclosure provides a point cloud partitioning method and device, and a computer-readable storage medium, including: when performing stripe division along the longest side, adjusting an initial partitioning position or determining the stripe division length according to the size of a preset block, to obtain a stripe division position, wherein, the length of the first n−1 stripes along the longest side is an integer multiple of the side length of the preset block, n is the number of divided stripes, and n is a positive integer greater than or equal to 2.

20 Claims, 15 Drawing Sheets

(56) References Cited

FOREIGN PATENT DOCUMENTS

CN    108632621 A    10/2018

OTHER PUBLICATIONS

Extended European Search Report for European Application No. 19936209.6 dated May 23, 2022. 8 pages.
Mammou, K. et al. "G-PCC codec description v2" ISO/IEC JTC1/SC29/WG11 N18189; Jan. 2019; Marrakech, MA. 39 pages.
Zhang, W. et al. "[G-PCC][CE13.2-related] An improvement for the uniform-geometry slice partition along the longest edge" ISO/IEC JTC1/SC29/WG11 MPEG 2019/m49121; Jul. 2019; Gothenburg, SE. 8 pages.
M45867, CE13.2_1-cfg_tileMode-1_tileNum-16_sliceMode-1_sliceNum-.
M45867, CE13.2_3-cfg_tileMode-0_sliceMode-3_sliceDepth-2_587a3e30.
M45867, CE13.2_4-cfg_tileMode-1_tileNum-16_sliceMode-1_sliceNum-.
M45867, CE13.2_5-cfg_tileMode-1_tileNum-16_sliceMode-1_sliceNum-.
M45867, CE13.2_6-cfg_tileMode-1_tileNum-16_sliceMode-1_sliceNum-.
M45867, CE13.2_7-cfg_tileMode-1_tileNum-16_sliceMode-1_sliceNum-.
M45867, CE13.2_8-cfg_tileMode-1_tileNum-16_sliceMode-1_sliceNum-.
International Search Report dated Mar. 12, 2020 in Application No. PCT/CN2019/094287, 4 pages, dated Mar. 12, 2020, 4 pp.
Luo, Dean, et al., "Mining Outliers from Point Cloud by Data Slice", IEEE, Oct. 2010, e-ISBN: 978-1-4244-6936-9, pp. 663-666, Oct. 2010, pp. 663-666.
Shao, Yiting, et al., "G-Pcc TMC13 CE13.2 report on point cloud tile and slice based coding", Peking University Shenzhen Graduate School, International Organisation for Standardisation, ISO/IEC JTC1/SC29/WG11 Coding of Moving Pictures and Audio, ISO/IEC JTC1/SC29/WG11 MPEG2018/m45867, Jan. 2019, Marrakech, Morocco, 11 pages.
Shao, Yiting, et al., "TMC13 CE13.2 report on point cloud tile and slice based coding", Peking University Shenzhen Graduate School, MPEG 125, Marrakech, Jan. 2019, slides, 23 pages.
M45867, CE13.2_2-cfg_tileMode-1_tileNum-16_sliceMode-1_sliceNum-.

* cited by examiner

POINT CLOUD SEGMENTATION METHOD AND DEVICE, AND COMPUTER READABLE STORAGE MEDIUM

CROSS-REFERENCE TO RELATED APPLICATION

The present application is a continuation application of International PCT Application No. PCT/CN2019/094287, filed on Jul. 1, 2019, the entire content of which is hereby incorporated by reference.

TECHNICAL FIELD

Implementations of the present disclosure relate to encoding and decoding technologies in the field of communication, and in particular to a method and device for partitioning a point cloud, and a computer readable storage medium.

BACKGROUND

In an encoder framework of Geometry-based Point Cloud Compression (G-PCC), after an input point cloud is partitioned into slices, each slice is encoded independently, while in a slice, geometric information of a point cloud and attribute information corresponding to a point cloud are encoded separately.

At present, there are mainly two methods for encoding geometric information: geometric information encoding based on an octree and geometric information encoding based on a triangle soup (trisoup). In a geometric information encoding framework based on a trisoup, in a case of performing slice partitioning along a longest edge, triangle patch fitting needs to be performed in a block. If a position of the slice partitioning is in a middle of a block, vertex coordinates on an edge of the block will belong to two adjacent slices respectively. Since different slices are processed in parallel and are independent of each other, when the triangle patch fitting is performed, a triangle soup structure in a block located at a position where slices are adjacent to each other is interrupted, and sampling needs to be performed on a triangle patch, therefore a sampling point cannot not be obtained at a discontinuous part of an inner surface of the block, resulting in a gap after geometry reconstruction. However, the geometry reconstruction will be carried out in an encoding and decoding process. Therefore, a gap of a point cloud model obtained through encoding or decoding reconstruction will be large, thus affecting quality of encoding and decoding.

SUMMARY

Implementations of the present disclosure provide a method and device for partitioning a point cloud, and a computer readable storage medium, which can improve accuracy of reconstruction of a point cloud model during an encoding and decoding processing, and improve quality of encoding and decoding.

Technical solutions of the implementations of the present disclosure may be implemented as follows.

In a first aspect, an implementation of the present disclosure provides a method for partitioning a point cloud, which includes: adjusting an initial partitioning position or determining a slice partitioning length according to a size of a preset block to obtain a slice partitioning position when performing slice partitioning along a longest edge, wherein a length of first n−1 slices along the longest edge is an integer multiple of a preset block side length, n is a quantity of partitioned slices, and n is a positive integer greater than or equal to 2.

In a second aspect, an implementation of the present disclosure further provides a method for partitioning a point cloud, which includes: determining a first side length of a longest edge in a space block of point cloud data to be encoded; adjusting an initial partitioning position according to a preset block side length to obtain a slice partitioning position; or, determining a partitioning length which is an integral multiple of the preset block side length; determining n slices based on the slice partitioning position; or, partitioning the space block in turn into n slices on the first side length along the longest edge according to the partitioning length by starting from an origin of a coordinate axis where the longest edge is located; wherein a length of first n−1 slices along the longest edge is an integer multiple of the preset block side length, n is a quantity of partitioned slices, and n is a positive integer greater than or equal to 2; and encoding the n slices.

In a third aspect, an implementation of the present disclosure provides a device for partitioning a point cloud, which includes: a partitioning part configured to adjust an initial partitioning position or determine a slice partitioning length according to a size of a preset block to obtain a slice partitioning position when performing slice partitioning along a longest edge, wherein a length of first n−1 slices along the longest edge is an integer multiple of a preset block side length, n is a quantity of partitioned slices, and n is a positive integer greater than or equal to 2.

In a fourth aspect, an implementation of the present disclosure further provides a device for partitioning a point cloud, which includes: a determination part configured to determine a first side length of a longest edge in a space block of point cloud data to be encoded, and adjust an initial partitioning position according to a preset block side length to obtain a slice partitioning position; or determine a partitioning length which is an integer multiple of a preset block side length; a partitioning part configured to determine n slices based on the slice partitioning position; or, partition the space block in turn into n slices on the first side length along the longest edge according to the partitioning length by starting from an origin of a coordinate axis where the longest edge is located; wherein a length of first n−1 slices along the longest edge is an integer multiple of the preset block side length, n is a quantity of partitioned slices, and n is a positive integer greater than or equal to 2; and an encoding part configured to encode the n slices.

In a fifth aspect, an implementation of the present disclosure further provides a device for partitioning a point cloud, which includes: a memory configured to store executable point cloud partitioning instructions; and a processor configured to implement the method of the first aspect or the second aspect according to the implementations of the present disclosure when executing the executable point cloud partitioning instructions stored in the memory.

In a sixth aspect, an implementation of the present disclosure provides a computer readable storage medium in which executable point cloud partitioning instructions are stored, and when the executable point cloud partitioning instructions are executed by a processor, the method of the first aspect or the second aspect according to the implementations of the present disclosure is implemented.

The implementations of the present disclosure provide a method and device for partitioning a point cloud, and a computer readable storage medium, including: adjusting an initial partitioning position or determining a slice partitioning length according to a size of a preset block to obtain a slice partitioning position when performing slice partitioning along a longest edge, wherein a length of first n−1 slices along the longest edge is an integer multiple of a preset block side length, n is a quantity of partitioned slices, and n is a positive integer greater than or equal to 2. By adopting the above technical implementation solutions, since in a process of encoding point cloud data to be encoded, when using a longest edge for slice partitioning, a device for partitioning a point cloud takes into account a preset block side length (a size of a preset block) for slice partitioning to achieve partitioning a space block in which the point cloud data is located along the longest edge, and a length of an obtained slice partitioned along the longest edge contains an integer multiple of the preset block side length, then, during encoding, in a case of using the longest edge for slice partitioning, when triangle patch fitting is performed in a preset block, vertex coordinates on an edge of a preset block only belong to a same slice, which eliminates a problem that a triangle soup structure in a preset block located at a position where slices are adjacent to each other is interrupted, so that an inner surface of the preset block is continuous, a sampling point may be obtained, and gaps of slices after geometry reconstruction are eliminated, thus improving quality of encoding. In addition, when a bitstream encoded based on the above-mentioned slice partitioning is decoded, a length of a slice along a longest edge in a point cloud model obtained by decoding and reconstruction is also an integer multiple of a preset block side length, so a problem of gaps between adjacent slices will not occur during reconstruction, thus improving quality of decoding.

DETAILED DESCRIPTION

In order to understand features and technical contents of implementations of the present disclosure in more detail, realization of the implementations of the present disclosure will be described in detail below in combination with the accompanying drawings, which are for reference only and are not intended to limit the implementations of the present disclosure.

In an implementation of the present disclosure, in an encoder framework of G-PCC for a point cloud, a point cloud of an input three-dimensional picture model is partitioned into slices, and then each slice is independently encoded.

Figure 1:
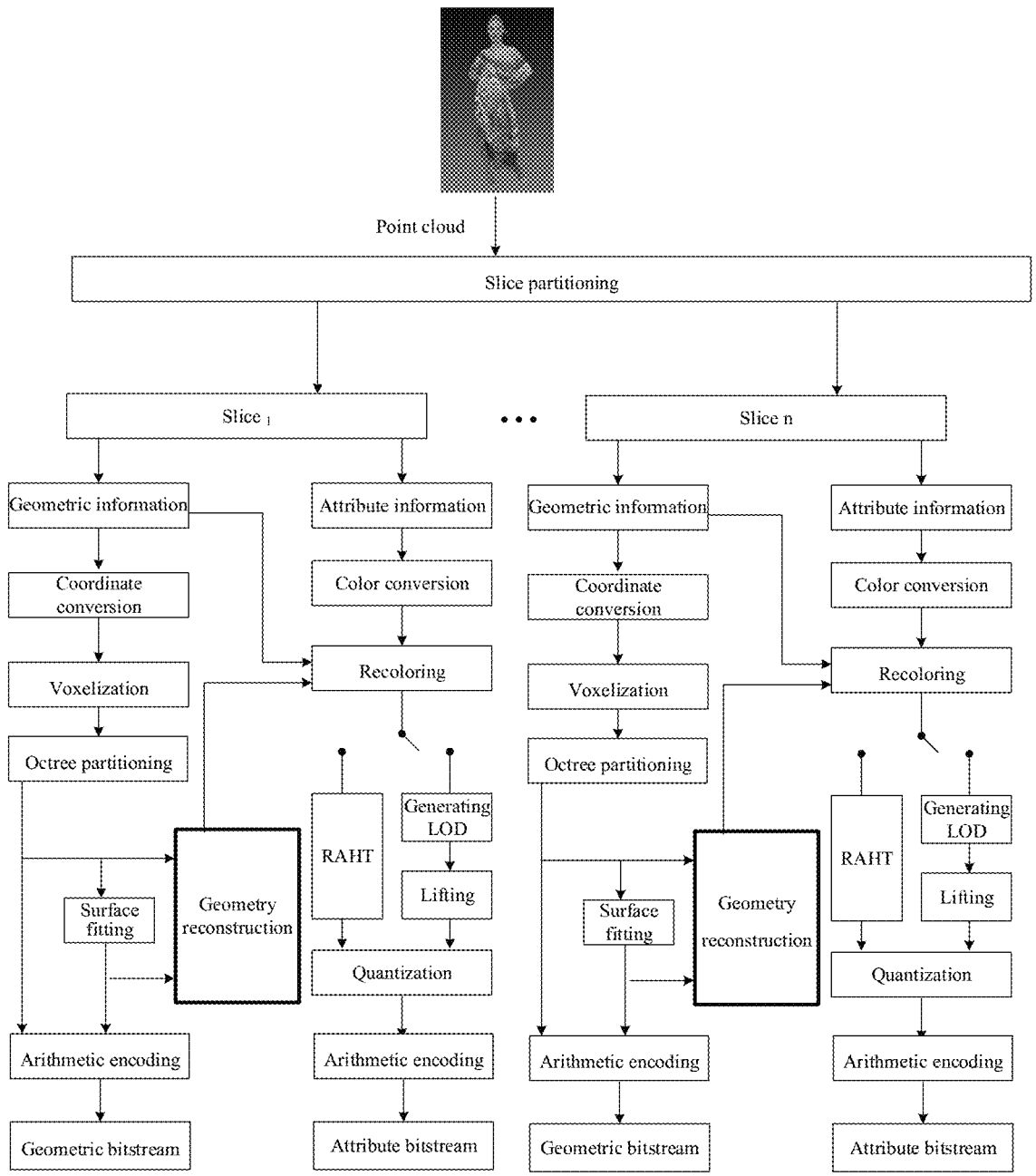
FIG. 1 is a block diagram of an exemplary encoding process according to an implementation of the present disclosure.

In a block diagram of a G-PCC encoding process as shown in FIG. 1, the process is applied in a point cloud encoder, for point cloud data to be encoded, the point cloud data is partitioned into multiple slices through slice partitioning. In a slice, geometric information of the point cloud and attribute information corresponding to a point cloud are encoded separately. In a process of geometry encoding, coordinate conversion is performed on geometric information, so that all point clouds are contained in a bounding box, and then quantization is performed. The quantization in this step mainly plays a role of scaling. Because of quantization rounding, geometric information of a part of point clouds is the same, thus a process of determining whether to remove duplicate points based on a parameter, quantization and removal of duplicate points is also called a voxelization process. Then, the bounding box is subjected to octree partitioning. In a process of geometric information encoding based on an octree, the bounding box is partitioned equally into eight sub-cubes, and a non-empty sub-cube (including points in a point cloud) are continued to be partitioned into eight equal parts, until leaf nodes obtained through partitioning are 1×1×1 unit cubes, then points in the leaf nodes are arithmetically encoded to generate a binary geometric bitstream, namely a geometric bitstream. In a process of geometric information encoding based on a triangle soup (trisoup), octree partitioning will also be performed first, but unlike the geometric information encoding based on the octree, for the trisoup, a point cloud does not need to be partitioned step by step into unit cubes with a side length of 1×1×1, but partitioning is stopped when the point cloud is partitioned into blocks (sub-blocks) with a side length of W. Based on a surface formed by distribution of the point cloud in a block, at most twelve vertexes (intersection points) produced by the surface and twelve edges of the block are obtained, and the vertexes are arithmetically encoded (surface fitting based on intersection points) to generate a binary geometric bitstream, namely a geometric bitstream. Vertexes are also used for achieving a process of geometry reconstruction, and reconstructed geometric information is used when an attribute of a point cloud is encoded.

In a process of attribute encoding, geometry encoding is completed, and after geometric information is reconstructed, color conversion is performed, and color information (i.e. attribute information) is converted from a RGB color space to a YUV color space. Then, reconstructed geometric information is used for recoloring a point cloud, so that attribute information that is not encoded corresponds to the reconstructed geometric information. In a process of color information encoding, there are mainly two transform methods, one is distance-based lifting transform which depends on Level of Detail (LOD) partitioning, and the other is to directly perform a Region Adaptive Hierarchal Transform (RAHT), and in both of the two methods, color information is converted from a spatial domain to a frequency domain to obtain a high-frequency coefficient and a low-frequency coefficient through transform, and finally the coefficients are quantized (i.e., quantized coefficients). Finally, geometry encoding data after octree partitioning and surface fitting, and attribute encoding data processed through quantized coefficients, are subjected to slice synthesis, and then vertex coordinates of a block are encoded in turn (i.e., arithmetic encoding) to generate a binary attribute bitstream, i.e., an attribute bitstream.

Figure 2:
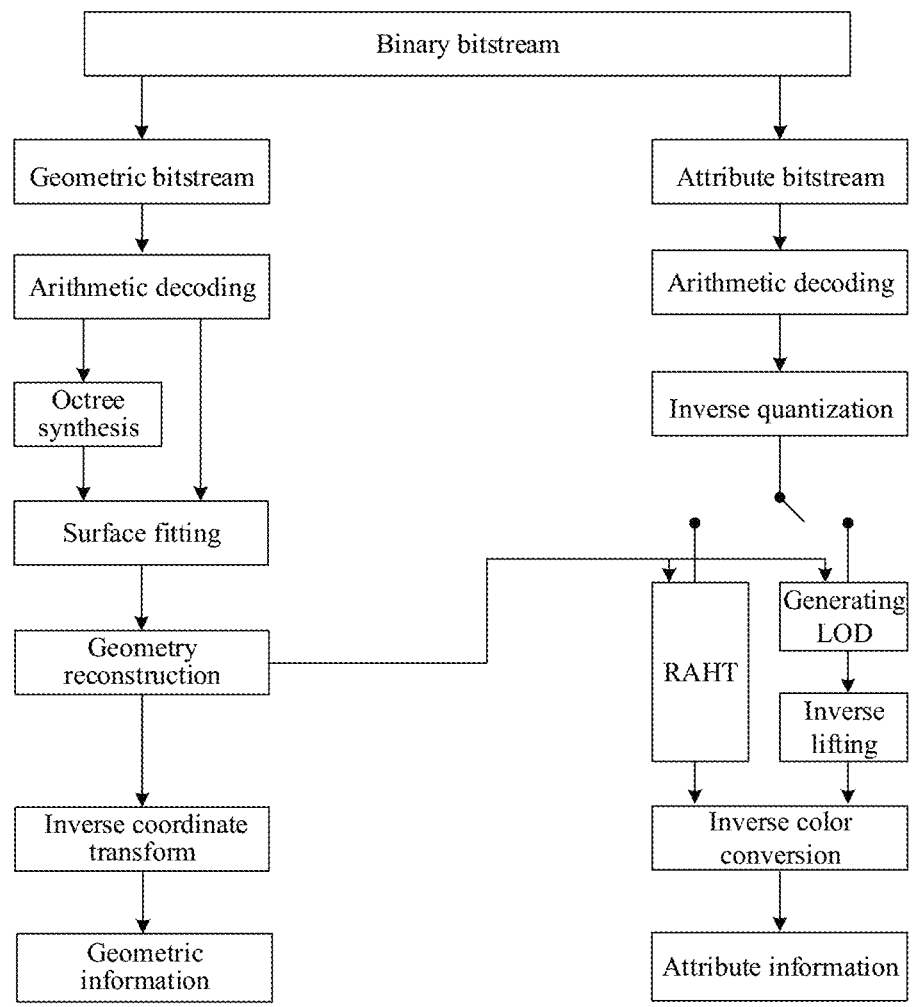
FIG. 2 is a block diagram of an exemplary decoding process according to an implementation of the present disclosure.

In a block diagram of a G-PCC decoding process as shown in FIG. 2, the process is applied in a point cloud decoder. The decoder acquires a binary bitstream, and independently decodes a geometric bitstream and an attribute bitstream in the binary bitstream. When decoding the geometric bitstream, geometric information of a point cloud is obtained through arithmetic decoding-octree synthesis-surface fitting-geometry reconstruction-inverse coordinate transform. When decoding the attribute bitstream, attribute information of the point cloud is obtained through arithmetic decoding-inverse quantization-LOD-based inverse lifting or RAHT-based inverse transform-inverse color conversion, and a three-dimensional picture model of point cloud data to be encoded is restored based on the geometric information and the attribute information.

A processing of slice partitioning based on a trisoup is a slice partitioning solution of Uniform-Geometry partitioning along a longest edge. The solution has been received by the standard MPEG-I (ISO/IEC 23090) Part 9, and corresponding codes have been integrated into a G-PCC point cloud encoder. Specific implementation of the solution is described as follows.

When a configuration parameter partitionMethod=2, a point cloud is partitioned into slices along a longest edge. Firstly, for input point cloud data, a maximum value and a minimum value of a component are searched for in three dimensions of x, y, and z, namely $\{x_{max}, x_{min}\}$, $\{y_{max}, y_{min}\}$ and $\{z_{max}, z_{min}\}$, a side length maxEdge of the longest edge maxEdgeAxis is determined to be maxEdge=max $\{\max\{x_{max}, y_{max}\}, z_{max}\}$, and a side length minEdge of a shortest edge minEdgeAxis is determined to be minEdge=min $\{\min\{x_{min}, y_{min}\}, z_{min}\}$. Then, starting from an origin of a coordinate axis where the longest edge is located, slice partitioning is performed with the side length minEdge of the shortest edge as an interval, and a quantity of partitioning is: sliceNum=⌈maxEdge/minEdge⌉, wherein ⌈ ⌉ refers to rounding up. Among several slices obtained through partitioning based on this method, lengths of first sliceNum−1 slices on the longest edge are equal, which is sliceSize=minEdge, and a length of a last slice on the longest edge is last_sliceSize=maxEdge−(sliceNum−1)*minEdge.

Figure 3:
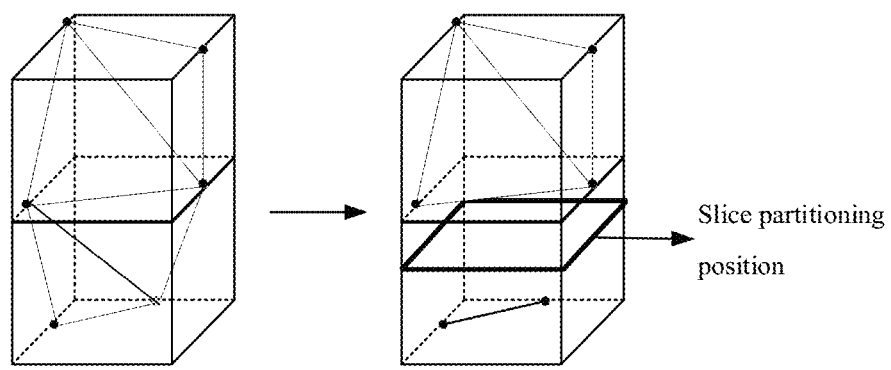
FIG. 3 is a schematic diagram of an exemplary slice partitioning position according to an implementation of the present disclosure.
Figure 4:
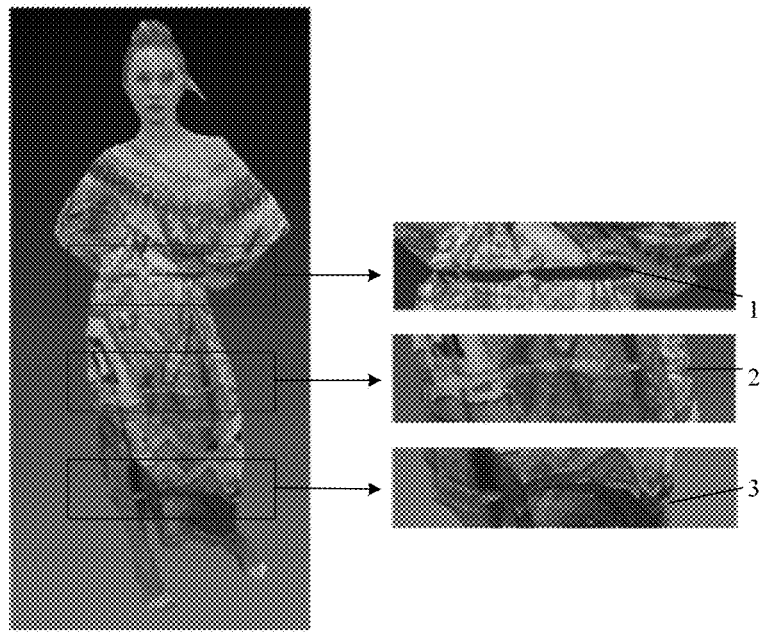
FIG. 4 is a first schematic diagram of an exemplary existing point cloud model according to an implementation of the present disclosure.

An encoding process and a decoding process of geometric information based on a trisoup need to perform triangle patch fitting in a block. If a position for slice partitioning is in a middle of a block, it will lead to that vertexes on an edge of the block respectively belong to two adjacent slices. Since different slices are processed in parallel and are independent of each other, when the triangle patch fitting is performed, a triangle soup structure in a block located at a position where slices are adjacent to each other is interrupted (a partitioning position of a slice as shown in FIG. 3 truncates a triangle soup structure), and sampling needs to be performed on a triangle patches, thus a sampling point cannot be obtained at a discontinuous part of an inner surface of the block, which results in a gap after reconstruction. That is to say, in a process of geometric information encoding based on a trisoup, slice partitioning is performed using a method of uniform partitioning along a longest edge, and when decoding a reconstructed three-dimensional picture model of a point cloud, there will be gaps between adjacent slices, which seriously affects reconstruction quality adversely (there is a problem of connection gaps 1, 2, and 3 in a decoded point cloud model as shown in FIG. 4).

Based on background of the foregoing introduction, a method for partitioning a point cloud according to an implementation of the present disclosure will be described in the following, which is applied to a device for partitioning a point cloud, here the device for partitioning a point cloud may be a point cloud encoder.

An implementation of the present disclosure provides a method for partitioning a point cloud, which may include: when a device for partitioning a point cloud performs slice partitioning along a longest edge, it adjusts an initial partitioning position or determines a slice partitioning length according to a size of a preset block to obtain a slice partitioning position, wherein a length of first n−1 slices along the longest edge is an integer multiple of a preset block side length, n is a quantity of partitioned slices, and n is a positive integer greater than or equal to 2.

In the implementation of the present disclosure, during an encoding processing of a three-dimensional picture model, point cloud data of three-dimensional picture model to be encoded in a space is acquired, wherein the point cloud data may include geometric information and attribute information of the three-dimensional picture model. In a process of encoding the three-dimensional picture model, geometric information of a point cloud and attribute information corresponding to a point are encoded separately. When performing slice partitioning during geometric information encoding, the method for partitioning a point cloud according to the implementation of the present disclosure is adopted.

It should be noted that the method for partitioning a point cloud according to the implementation of the present disclosure is applied in a scene of a method of slice partitioning along a longest edge in geometric information encoding based on a trisoup.

In the implementation of the present disclosure, when the device for partitioning a point cloud performs slice partitioning along a longest edge, the device for partitioning a point cloud uses an idea of including an integer multiple of a preset block side length, adjusts an initial partitioning position of a partitioned slice so that a slice partitioning position includes an integer multiple of the preset block side length. Or, a partitioning length which is an integral multiple of the preset block side length is directly determined according to an actual situation, and the device for partitioning a point cloud directly performs slice partitioning based on the partitioning length to obtain a slice partitioning position.

Figure 5:
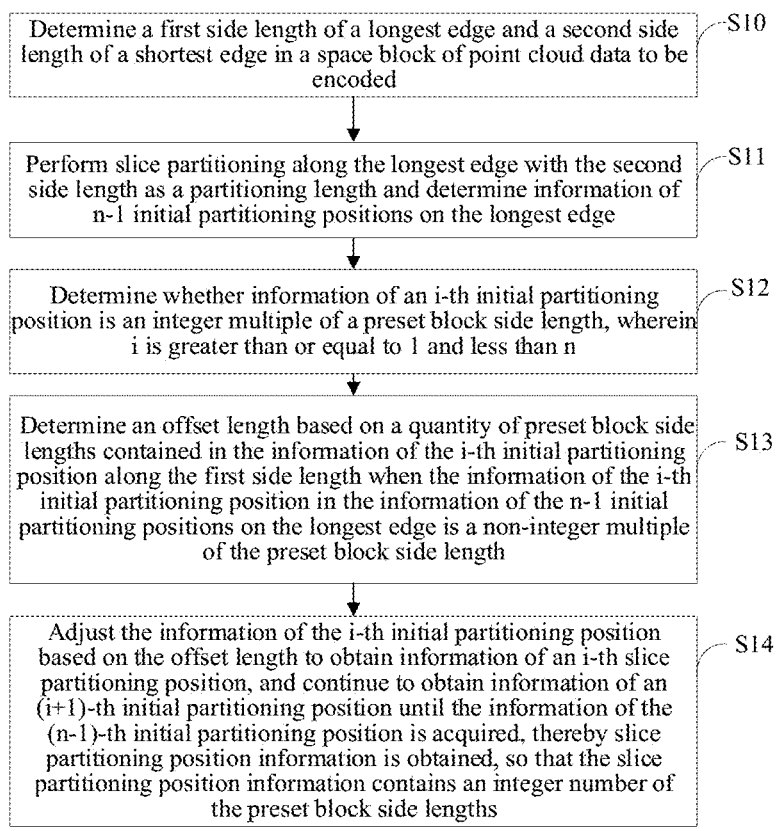
FIG. 5 is a first flowchart of a method for partitioning a point cloud according to an implementation of the present disclosure.

In the implementation of the present disclosure, an implementation process of adjusting the initial partitioning position according to the size of the preset block to obtain the slice partitioning position is actually as follows: when performing slice partitioning along a longest edge, initial partitioning position information is adjusted according to a preset block side length to obtain slice partitioning position information, so that a length of first n−1 slices along the longest edge is an integer multiple of the preset block side length, n is a quantity of partitioned slices, and n is a positive integer greater than or equal to 2. As shown in FIG. 5, a detailed implementation process includes acts S10-S14, which are as follows.

In S10, a first side length of a longest edge and a second side length of a shortest edge in a space block of point cloud data to be encoded are determined.

Based on three-dimensional coordinates corresponding to a point in point cloud data to be encoded, a device for partitioning a point cloud may search for a maximum value and a minimum value of a component in three dimensions of x, y, and z and find a longest edge from corresponding maximum and minimum values in the three dimensions, so as to obtain a side length of the longest edge, i.e. a first side length, and a second side length of a shortest edge.

Exemplarily, a device for partitioning a point cloud finds a maximum value and a minimum value of a component among many component values in three dimensions of x, y, and z, that is $\{x_{max}, x_{min}\}$, $\{y_{max}, y_{min}\}$ and $\{z_{max}, z_{min}\}$, and determines a first side length maxEdge=max$\{\max\{x_{max}, y_{max}\}, z_{max}\}$ of a longest edge maxEdgeAxis with a largest value from $x_{max}$, $y_{max}$, and $z_{max}$, and determines a smallest edge of a shortest edge minEdgeAxis with a smallest value from $x_{min}$, $y_{min}$, and $z_{min}$, i,e, a second side length minEdge=min$\{\min\{x_{min}, y_{min}\}, z_{min}\}$.

It should be noted that, in the implementation of the present disclosure, a space occupied by point cloud data in a three-dimensional space is here understood as a space block of the point cloud data. That is to say, the space block here may be understood as a space based on a maximum value and a minimum value of a component.

In S11, slice partitioning is performed along the longest edge with the second side length as a partitioning length, and information of n−1 initial partitioning positions on the longest edge is determined.

In the implementation of the present disclosure, a device for partitioning a point cloud performs slice partitioning along a longest edge with a second side length as an interval, so that a quantity of slices to be partitioned may be determined, and then based on a partitioning order, information of n−1 initial partitioning positions on the longest edge may be determined when partitioned into n slices.

It should be noted that, in the implementation of the present disclosure, after acquiring a second side length, a point cloud device may take the second side length as an initial partitioning length, then take the initial partitioning length as a partitioning interval, and perform partitioning in turn on a longest edge to obtain information of n initial partitioning positions.

In S12, it is determined whether information of an i-th initial partitioning position is an integer multiple of a preset block side length, wherein i is greater than or equal to 1 and less than n.

In the implementation of the present disclosure, after a device for partitioning a point cloud obtains information of initial partitioning positions, the device for partitioning the point cloud determines a quantity of preset block side lengths corresponding respectively to information of first n−1 initial partitioning positions among information of n initial partitioning positions to sequentially determine whether the information of the n−1 initial partitioning positions is an integer multiple of a preset block side length according to a partitioning order.

In the implementation of the present disclosure, for information of first n−1 initial partitioning positions, it is determined how many blocks information of an initial partitioning position may correspond to, that is, a quantity of preset block side lengths corresponding respectively to information of an initial partitioning position is obtained.

For partitioning of an i-th slice, a device for partitioning a point cloud determines whether information of an i-th initial partitioning position is an integer multiple of a preset block side length.

In detail, a device for partitioning a point cloud respectively divides information of an i-th initial partitioning position by a preset block side length to obtain a quantity of preset block side lengths. When the quantity of the preset block side lengths is not an integer, it is determined that the information of the i-th initial partitioning position corresponding to the quantity of the preset block side lengths is a non-integer multiple of a preset block side length; and when the quantity of the preset block side lengths is an integer, it is determined that the information of the i-th initial partitioning position corresponding to the quantity of the preset block side lengths is an integer multiple of the preset block side length.

Herein, corresponding quantity of the preset block side lengths is obtained by dividing a length of the i-th initial partitioning position by the preset block side length respectively. It should be noted that in the implementation of the present disclosure, determinations of a quantity of preset block side lengths respectively corresponding to information of first n−1 initial partitioning positions in information of n initial partitioning positions are all processing of numerical values performed along a direction of a longest edge.

Exemplarily, for information of one initial partitioning position, a process of acquiring a quantity $n_B$ of blocks included along a longest edge is following formula (1).

$$n_B = C_p/\text{blockSize} \quad (1)$$

In which, $C_p$ is information of one initial partitioning position, blockSize is a preset block side length.

It should be noted that $n_B$ here may be an integer or a non-integer. $C_p$ needs to be adjusted when $n_B$ is a non-integer, and the implementations of the present disclosure are all implemented based on a fact that $n_B$ is a non-integer.

In S13, an offset length is determined based on a quantity of preset block side lengths contained in the information of the i-th initial partitioning position along the first side length when the information of the i-th initial partitioning position in the information of the n−1 initial partitioning positions on the longest edge is a non-integer multiple of the preset block side length.

In S14, the information of the i-th initial partitioning position is adjusted based on the offset length to obtain information of an i-th slice partitioning position, continuing to obtain information of an (i+1)-th initial partitioning position until the information of the (n−1)-th initial partitioning position is acquired, thereby slice partitioning position information is obtained, so that the slice partitioning position information contains an integer number of preset block side lengths.

In the implementation of the present disclosure, as $n_B$ is a non-integer, information of initial partitioning positions needs to be adjusted, and information of an i-th slice initial partitioning position is called information of an i-th initial partitioning position. That is, a device for partitioning a point cloud acquires the information of the i-th initial partitioning position which is a non-integer multiple of a preset block side length from information of n−1 initial partitioning positions, and determines an offset length according to a quantity of preset block side lengths contained in the information of the i-th initial partitioning position along a first side length. Finally, according to the offset length, the information of the i-th initial partitioning position is adjusted to obtain information of an i-th slice partitioning position, i is circularly increased by 1, to continuously obtain information of an (i+1)-th initial partitioning position until information of an (n−1)-th initial partitioning position is acquired, so that slice partitioning position information is obtained, which contains an integer number of preset block side lengths.

In some implementations of the present disclosure, there are several methods for obtaining an offset length based on a quantity of preset block side lengths contained in information of an i-th initial partitioning position along a first side length and for adjusting the information of the i-th initial partitioning position.

(1) A quantity of preset block side lengths is rounded up to obtain an offset length corresponding to information of an i-th initial partitioning position; the offset length is added to the information of the i-th initial partitioning position to obtain information of an i-th slice partitioning position, continuing to obtain information of an (i+1)-th initial partitioning position until information of an (n−1)-th initial partitioning position is acquired, so that slice partitioning position information is obtained.

In the implementation of the present disclosure, a rounding operation on a quantity of preset block side lengths by a device for partitioning a point cloud may be a rounding up operation, so that a deviation from a rounding result, i.e., an offset length, is obtained. Since it is achieved by rounding up, it means that information of an i-th initial partitioning position is too small, thus the information of the i-th initial partitioning position needs to be added with a corresponding offset length, so as to determine information of an i-th slice partitioning position.

Herein, regarding a case where a quantity of preset block side lengths is a non-integer, a device for partitioning a point cloud performs a rounding up operation on the quantity of the preset block side lengths, so that one slice may contain $\lceil n_B \rceil$ block side lengths on a longest edge, wherein $\lceil \; \rceil$ indicates rounding up.

Figure 6:
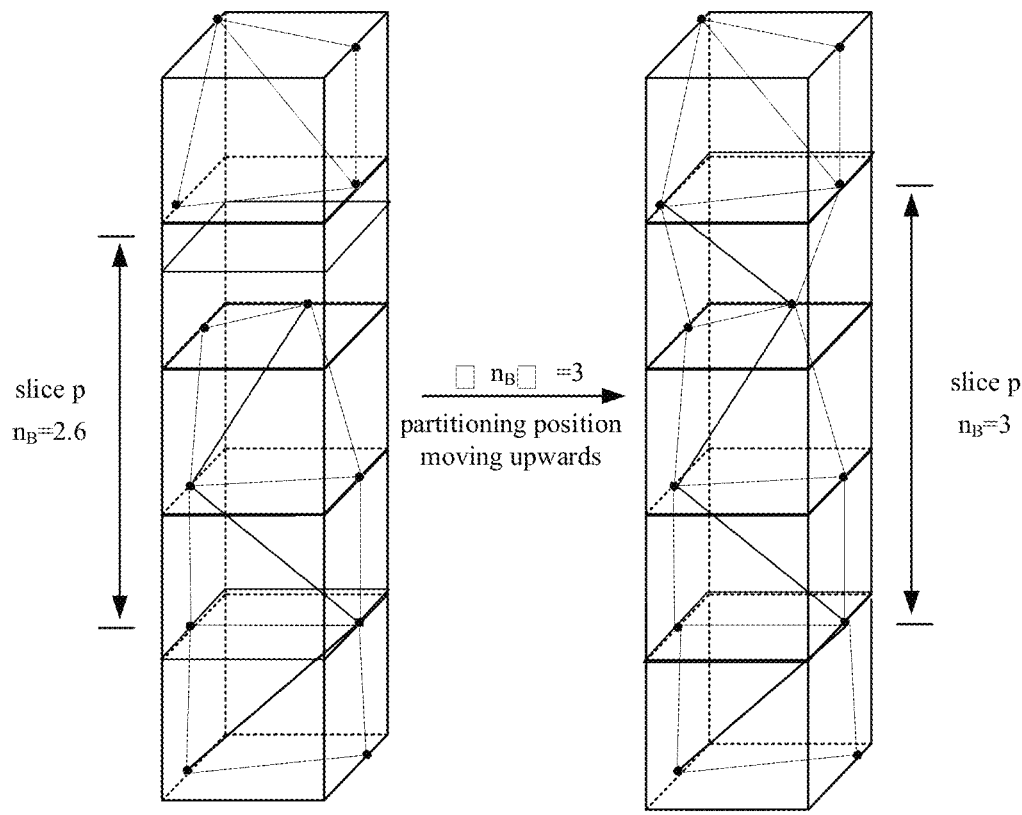
FIG. 6 is a first schematic diagram of an exemplary slice partitioning according to an implementation of the present disclosure.

As shown in FIG. 6, $n_B$ corresponding to information of an initial partitioning position slice p is 2.6. At this time, 2.6 is rounded up to obtain an offset length of 0.4, and an offset is added to information of an initial partitioning position to obtain partitioning position information of the slice p.

(2) A quantity of preset block side lengths is rounded down to obtain an offset length corresponding to information of an i-th initial partitioning position; the offset length is subtracted from the information of the i-th initial partitioning position to obtain information of an i-th slice partitioning position, continuing to obtain information of an (i+1)-th initial partitioning position until information of an (n−1)-th initial partitioning position is acquired, so that slice partitioning position information is obtained.

In the implementation of the present disclosure, a rounding operation on a quantity of preset block side lengths by a device for partitioning a point cloud may be a rounding down operation, so that a deviation from a rounding result, i.e., an offset length, is obtained. Since it is achieved by rounding down, it means that information of an i-th initial partitioning position is too large, thus a corresponding offset length needs to be subtracted from the information of the i-th initial partitioning position, so as to determine slice partitioning position information.

Herein, regarding a case where a quantity of preset block side lengths is a non-integer, a device for partitioning a point cloud performs a rounding down operation on the quantity of the preset block side lengths, so that one slice may contain $\lfloor n_B \rfloor$ block side lengths on a longest edge, wherein $\lfloor \; \rfloor$ indicates rounding down.

Figure 7:
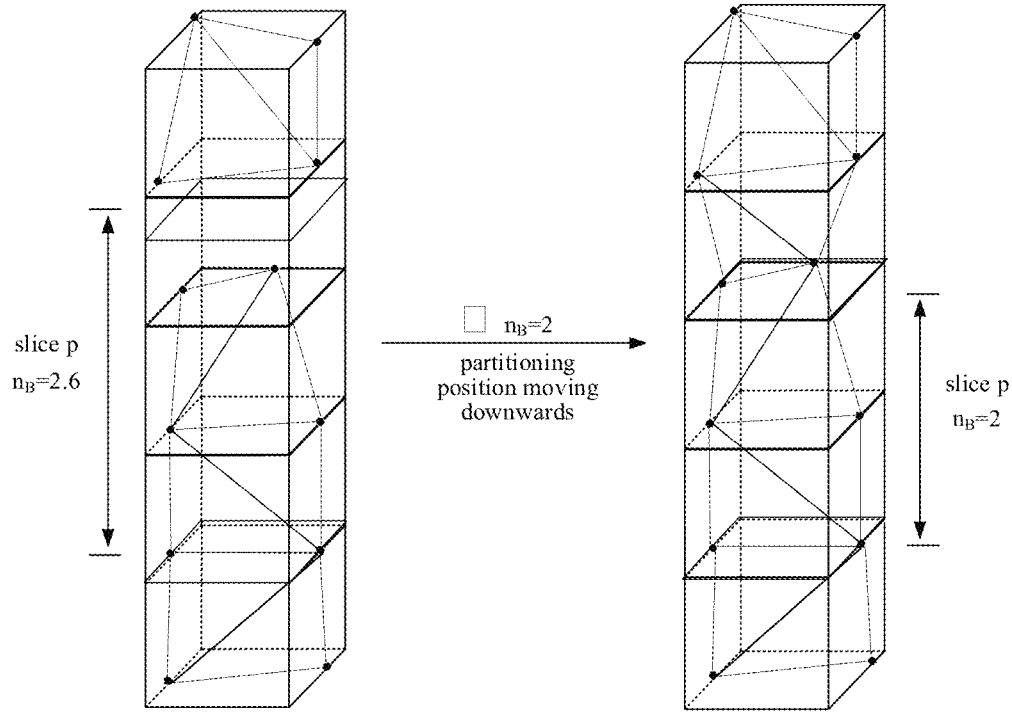
FIG. 7 is a second schematic diagram of an exemplary slice partitioning according to an implementation of the present disclosure.

As shown in FIG. 7, $n_B$ corresponding to information of an initial partitioning position slice p is 2.6. At this time, 2.6 is rounded down to obtain an offset length of 0.6, and an offset is subtracted from information of an initial partitioning position to obtain slice partitioning position information.

(3) A quantity of preset block side lengths is rounded up to obtain a first offset length corresponding to information of an i-th initial partitioning position; the quantity of the preset block side lengths is rounded down to obtain a second offset length corresponding to the information of the i-th initial partitioning position; and a minimum length of the first offset length and the second offset length is used as an offset length. When the offset length is the first offset length, the offset length is subtracted from the information of the i-th initial partitioning position to obtain information of an i-th slice partitioning position, and then to continuously obtain information of an (i+1)-th initial partitioning position until information of an (n−1)-th initial partitioning position is acquired, so that slice partitioning position information is obtained. When the offset length is the second offset length, the offset length is added to the information of the i-th initial partitioning position to obtain information of an i-th slice partitioning position, and then to continuously obtain information of an (i+1)-th initial partitioning position until information of an (n−1)-th initial partitioning position is acquired, so that slice partitioning position information is obtained.

In the implementation of the present disclosure, a rounding operation on a quantity of preset block side lengths by a device for partitioning a point cloud may be a rounding operation of rounding to a nearest whole number, so that a deviation from a rounding result, that is, an offset length, is obtained.

Specifically, a device for partitioning a point cloud performs rounding up and rounding down operations on a quantity of preset block side lengths to obtain a first offset length and a second offset length corresponding to a length of an i-th initial partitioning position, and takes a smallest offset length among the first offset length and the second offset length as an offset length. Therefore, since the first offset length is obtained by rounding up and the second offset length is obtained by rounding down, if the first offset length is used as the offset length, the first offset length needs to be added to information of an i-th initial partitioning position, so as to obtain information of an i-th slice partitioning position. If the second offset length is used as the offset length, the first offset length needs to be subtracted from information of an i-th initial partitioning position to acquire a partitioning length and obtain information of an i-th slice partitioning position.

It should be noted that in the implementation of the present disclosure, since in information of first n−1 initial partitioning positions, there may be a case where a corresponding first offset length is an offset length, and there may be a case where a second offset length is an offset length, it is necessary to determine first initial partitioning position information with an offset length being a first offset length and/or second partitioning position information with an offset length being a second offset length for the information of the first n−1 initial partitioning positions.

Figure 8:
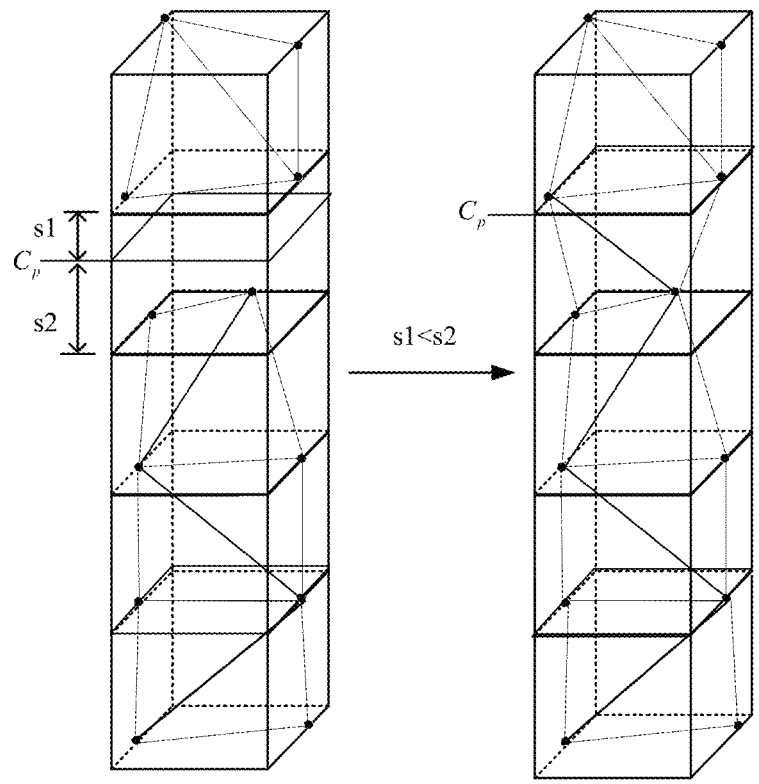
FIG. 8 is a third schematic diagram of an exemplary slice partitioning according to an implementation of the present disclosure.
Figure 9:
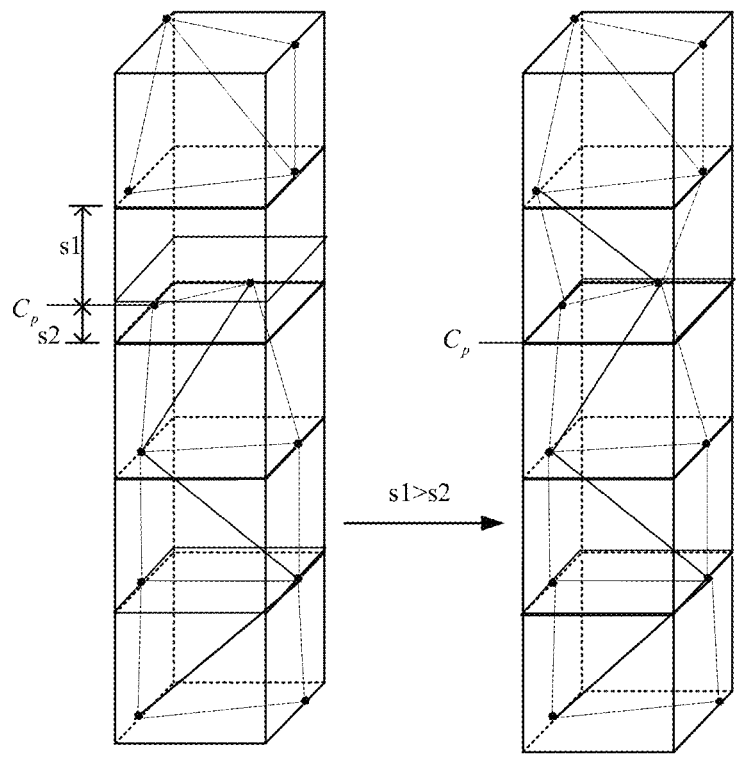
FIG. 9 is a fourth schematic diagram of an exemplary slice partitioning according to an implementation of the present disclosure.

Exemplarily, an operation of rounding up an integer number of blocks when adjusting a slice initial partitioning position is modified to that of shifting to a direction with a smaller offset during adjusting. A first offset length is s1 and a second offset length is s2, so when s1<s2, as shown in FIG. 8, a position of $C_p$ is moved upwards along a longest edge by +s1, and when s2<s1, as shown in FIG. 9, a position of $C_p$ is moved downwards along the longest edge by s2.

Figure 10:
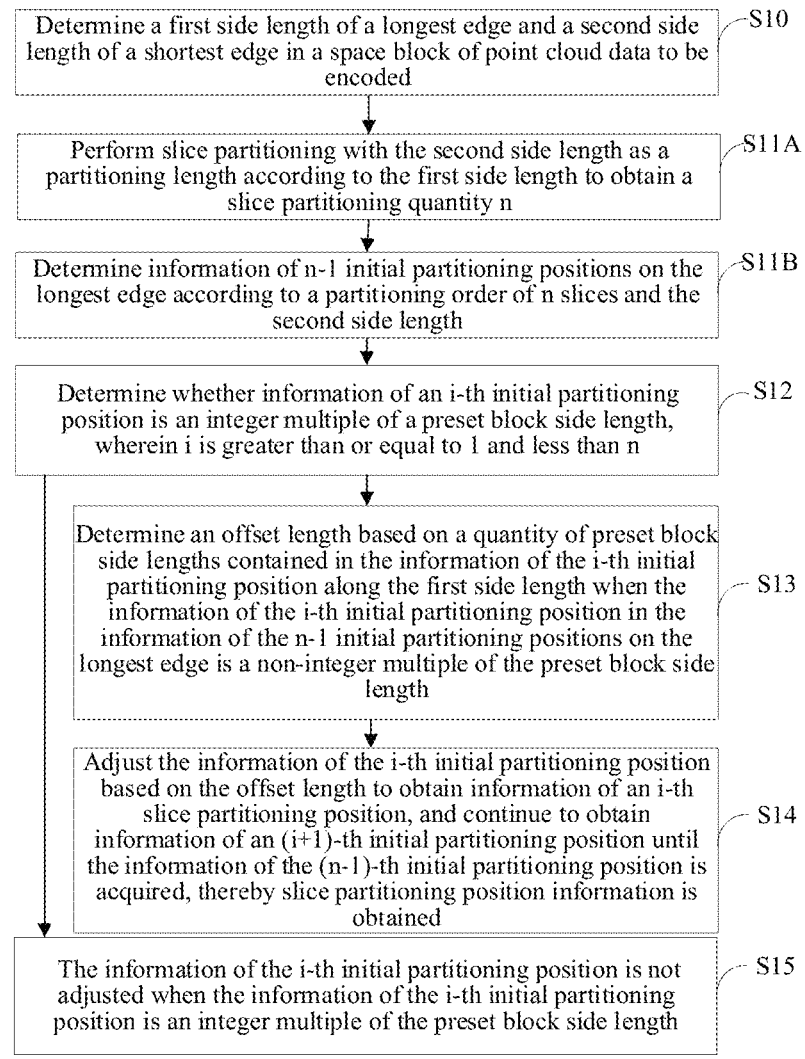
FIG. 10 is a second flowchart of a method for partitioning a point cloud according to an implementation of the present disclosure.

In some implementations of the present disclosure, as shown in FIG. 10, implementation of S11 further includes acts S11A and S11B, and after S14, it further includes S15, which are as follows.

In S11A, slice partitioning is performed with the second side length as a partitioning length according to the first side length to obtain a slice partitioning quantity n.

In S11B, information of n−1 initial partitioning positions on the longest edge is determined according to a partitioning order of n slices and the second side length.

A device for partitioning a point cloud divides a second side length by a first side length to obtain a total number n of slices, and then determines information of an n−1 initial partitioning positions on a longest edge according to a partitioning order of the n slices and the second side length.

In the implementation of the present disclosure, slice partitioning is performed from an origin of a coordinate axis where a longest edge is located at an interval of a side length minEdge of a shortest edge, and a total number of slices partitioned by a device for partitioning a point cloud is: sliceNum=⌈maxEdge/minEdge⌉, wherein ⌈ ⌉ means rounding up. Among the sliceNum slices obtained through partitioning based on this method, lengths of first sliceNum−1 slices on the longest edge are equal, which is sliceSize=minEdge and a length of a last slice on the longest edge is last_sliceSize=maxEdge−(sliceNum−1)*minEdge.

In the implementation of the present disclosure, information $C_p$ of an initial partitioning position of a p-th slice is $C_p$=p*sliceSize, wherein sliceSize is a second side length, and information of n initial partitioning positions on a longest edge may be determined and obtained according to a partitioning order.

In S15, the information of the i-th initial partitioning position is not adjusted when the information of the i-th initial partitioning position is an integer multiple of the preset block side length.

After determining whether information of an i-th initial partitioning position is an integer multiple of a preset block side length, a device for partitioning a point cloud indicates that a block has not been truncated by slice partitioning when the information of the i-th initial partitioning position on a longest edge is an integer multiple of the preset block side length, so it is unnecessary to adjust the information of the i-th initial partitioning position.

Exemplarily, when a device for partitioning a point cloud acquires a quantity n partitioned slices, information of initial partitioning positions of first n−1 slices is acquired in a following way: when partitioning a p-th slice, information $C_p$ of an initial partitioning position of the p-th slice is obtained as $C_p$=p*sliceSize, wherein sliceSize is a second side length. Then, it is determined whether information of a p-th initial partitioning position is an integer multiple of a preset block side length, that is, the information of the p-th initial partitioning position is divided by the preset block side length to obtain a quantity $n_B$ of preset blocks contained in the information of the p-th initial partitioning position on a longest edge: $C_p$% blockSize=$n_B$, wherein blockSize sliceSize is the preset block side length, and when $n_B$ is not an integer, a rounding operation is performed on $n_B$ to obtain an offset s. Then, if the operation is a rounding down operation, then $C_p$=$C_p$+(blockSize−s), so as to obtain a partitioning position of the p-th slice. When $n_B$ is an integer, $C_p$=$C_p$, thus a partitioning position of the p-th slice is determined.

Figure 11:
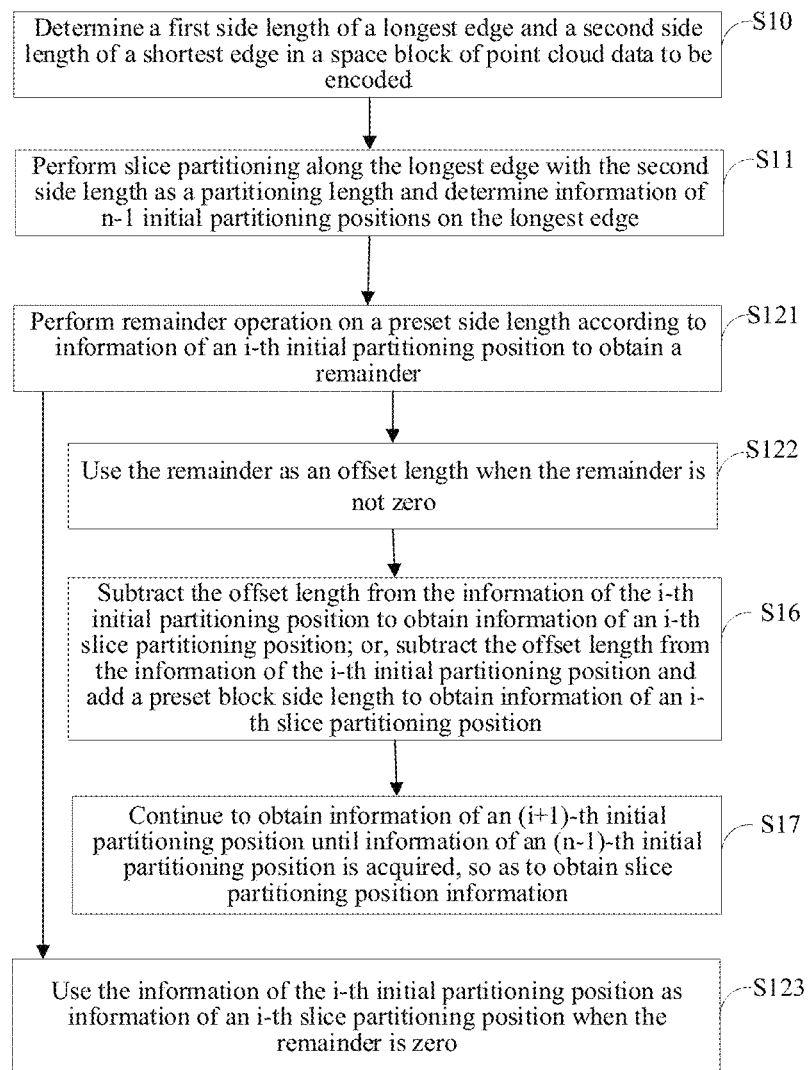
FIG. 11 is a third flowchart of a method for partitioning a point cloud according to an implementation of the present disclosure.

In some implementations of the present disclosure, as shown in FIG. 11, specific implementation of a method for partitioning a point cloud in S12 may further include acts S121-S123. Moreover, after S122, the method for partitioning a point cloud according to the implementation of the present disclosure may further include acts S16-S18, which are as follows.

In S121, remainder operation is performed on a preset block side length is taken according to information of an i-th initial partitioning position to obtain a remainder.

In S122, the remainder is used as an offset length when the remainder is not zero.

In S123, the information of the i-th initial partitioning position is used as information of an i-th slice partitioning position when the remainder is zero.

In the implementation of the present disclosure, when a device for partitioning a point cloud partitions any one slice in the information of the n−1 initial partitioning positions, it may use information of an initial partitioning position corresponding to the slice to perform remainder operation on a preset block side length to obtain a remainder. If the remainder is not zero, the remainder is taken as an offset length. When the remainder is zero, the information of the i-th initial partitioning position is taken as information of an i-th slice partitioning position.

It should be noted that a device for partitioning a point cloud may also perform remainder operation on a preset block side length by using information of an initial partitioning position to obtain a remainder. If the remainder is not zero, it indicates that a quantity of preset block side lengths is not an integer. If the remainder is zero, it indicates that a quantity of preset block side lengths is an integer.

Exemplarily, for partitioning of a p-th slice, information of an initial partitioning position of the p-th slice is obtained from information of first n−1 initial partitioning positions, and according to $C_p$ % $^{blockSize=s}$, a remainder s is obtained, wherein when s is not zero, it is used as an offset length. Among them, blockSize is a preset block side length.

In S16, the offset length is subtracted from the information of the i-th initial partitioning position to obtain information of an i-th slice partitioning position; or, the offset length is subtracted from the information of the i-th initial partitioning position and a preset block side length is added to obtain information of an i-th slice partitioning position.

In S17, information of the (i+1)-th initial partitioning position is obtained continuously until the information of the (n−1)-th initial partitioning position is acquired, so as to obtain slice partitioning position information.

In the implementation of the present disclosure, when a remainder is not zero, a device for partitioning a point cloud may directly use the remainder as an offset length for adjusting information of an i-th initial partitioning position corresponding to the remainder. In detail, based on an idea of rounding down, the device for partitioning the point cloud subtracts the offset length from the information of the i-th initial partitioning position to obtain information of an i-th slice partitioning position. Based on an idea of rounding up, the device for partitioning the point cloud subtracts the offset length from the information of the i-th initial partitioning position and then adds a preset block side length, so as to obtain information of an i-th slice partitioning position. Finally, information of an (i+1)-th initial partitioning position is continuously obtained until information of an (n−1)-th initial partitioning position is acquired, so as to obtain slice partitioning position information.

Figure 12:
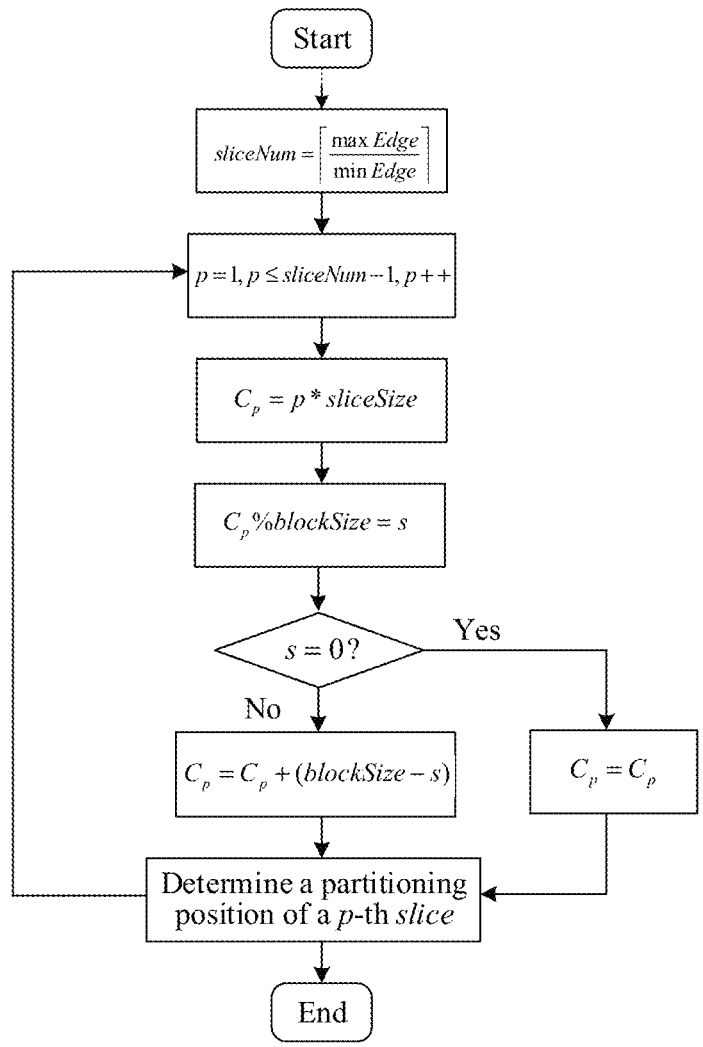
FIG. 12 is a flowchart of an exemplary method for partitioning a point cloud according to an implementation of the present disclosure.

Exemplarily, as shown in FIG. 12, when a device for partitioning a point cloud acquires a quantity n partitioned slices, information of initial partitioning positions of first n−1 slices is acquired in a following way: when partitioning a p-th slice, information $C_p$ of an initial partitioning position of the p-th slice is obtained as $C_p$=p*sliceSize, wherein sliceSize is a second side length. Then, each time when determining whether information of a p-th initial partitioning position is an integer multiple of a preset block side length, remainder operation may be performed on the preset block side length by the information of the p-th initial partitioning position to obtain ($C_p$)mod(blockSize)=s. When s is zero, it indicates that $n_B$ is an integer, and at this time, $C_p$=$C_p$. When s is not zero, it indicates that $n_B$ is not an integer, herein s is used as an offset. When an idea of rounding up is adopted, the information $C_p$ of the initial partitioning position of the p-th slice is $C_p$=$C_p$+(blockSize−s). When an idea of rounding down is adopted, the information $C_p$ of the initial partitioning position of the p-th slice is $C_p$=$C_p$−s.

It should be noted that, in the implementation of the present disclosure, a device for partitioning a point cloud may perform a process of sequentially determining information of partitioning positions of slices according to a partitioning order based on the above-mentioned implementation idea, and performs an encoding processing on n slices only after partitioning of the n slices is completed.

It may be understood that, since in a process of encoding point cloud data to be encoded, when using a longest edge for slice partitioning, a device for partitioning a point cloud takes into account a preset block side length (size of a preset block) for slice partitioning, achieves partitioning a space block in which the point cloud data is located along the longest edge, and a length of obtained slices partitioned along the longest edge contains an integer multiple of the preset block side length, then, during encoding, in a case of using the longest edge for slice partitioning, when triangle patch fitting is performed in a preset block, vertex coordinates on an edge of a preset block only belong to a same slice, which eliminates a problem that a triangle soup structure in the preset block located at a position where slices are adjacent to each other is interrupted, so that an inner surface of the preset block is continuous, a sampling point may be obtained, and gaps in the slices that appear after geometry reconstruction are eliminated, thus improving quality of encoding. In addition, when a bitstream encoded based on the above-mentioned slice partitioning is decoded, a length of a slice along a longest edge in a point cloud model obtained by decoding and reconstruction is also an integer multiple of a preset block side length, so a problem of gaps between adjacent slices will not occur during reconstruction, thus improving quality of decoding.

Figure 13:
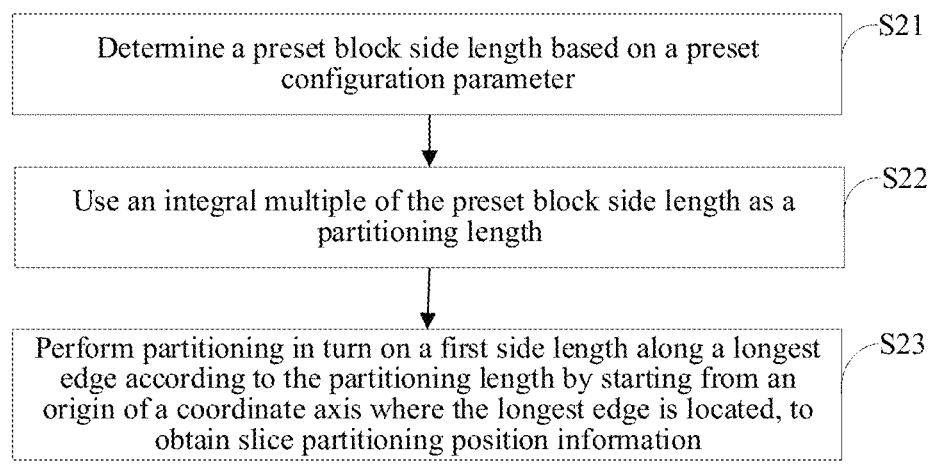
FIG. 13 is a fourth flowchart of a method for partitioning a point cloud according to an implementation of the present disclosure.

An implementation process of determining a slice partitioning length and obtaining information of a slice partitioning position according to the preset block side length is as shown in FIG. 13, and a detailed implementation process includes acts S21-S22, which are as follows.

In S21, a preset block side length is determined based on a preset configuration parameter.

In S22, an integral multiple of the preset block side length is used as a partitioning length.

In S23, partitioning is performed in turn on a first side length along a longest edge according to the partitioning length by starting from an origin of a coordinate axis where the longest edge is located, to obtain slice partitioning position information.

In a process of slice partitioning along a longest edge for a point cloud, a device for partitioning a point cloud may acquire a preset configuration parameter, namely trisoup_node_size_log2. When partitioning a preset block, i.e., a block, a preset block side length is determined based on the preset configuration parameter.

In some implementations of the present disclosure, the preset block side length is trisoup_node_size_log2 power of 2, that is, a side length of a block is $W=2^{trisoup\_node\_size\_log2}$.

In the implementation of the present disclosure, a device for partitioning a point cloud uses a numerical value which is an integral multiple of a preset block side length as a partitioning length.

In some implementations of the present disclosure, an implementation process of a device for partitioning a point cloud taking an integer multiple of a preset block side length as a partitioning length may be as follows: determining a second side length of a shortest edge in a space block; taking the second side length as an initial partitioning length; determining a quantity of preset block side lengths corresponding to the initial partitioning length; performing a rounding operation based on the quantity of the preset block side lengths to obtain an offset length corresponding to the initial partitioning length; and adjusting the initial partitioning length based on the offset length to obtain a partitioning length.

In some implementations of the present disclosure, an implementation process of a device for partitioning a point cloud taking an integer multiple of a preset block side length as a partitioning length may be as follows: taking a second side length as an initial partitioning length; performing remainder operation on the initial partitioning length to obtain a remainder; when the remainder is zero, taking the initial partitioning length as a partitioning length; when the remainder is not zero, taking the remainder as an offset length; subtracting the offset length from the initial partitioning length to obtain a partitioning length; or, subtracting the offset length from the initial partitioning length and adding the preset block side length to obtain a partitioning length.

It should be noted that in the implementation of the present disclosure, a device for partitioning a point cloud may perform slice partitioning on point cloud data along a longest edge according to a length of a second side length. Here, after initial partitioning, the device for partitioning the point cloud may adjust an initial partitioning length (the second side length) to achieve a purpose that the initial partitioning length is an integer multiple of a preset block side length. The device for partitioning the point cloud may make adjustments in two ways, one way is to directly divide the initial partitioning length by the preset block side length to obtain a quantity of preset block side lengths, round the quantity of the preset block side lengths to obtain an offset length, and adjust the initial partitioning length to an integer multiple of the preset block side length through the offset length. A specific rounding method is consistent with the rounding method of the previous implementations, including rounding up, rounding down, rounding to a nearest whole number, etc., which are not limited in the implementation of the present disclosure, and a corresponding adjustment method is also consistent with an adjustment principle of the previous implementations, which will not repeated here. Another way is to directly perform remainder operation on the initial partitioning length, determine whether the remainder is zero to determine whether the initial partitioning length is an integer multiple of the preset block side length. If the initial partitioning length is an integer multiple of the preset block side length, the initial partitioning length remains unchanged. If the initial partitioning length is not an integer multiple of the preset block side length, the remainder is used as an offset length for adjusting the initial partitioning length, and the remainder may be directly subtracted from the initial partitioning length, or after subtracting the remainder from the initial partitioning length, a preset integer multiple of the preset block side length is added, no matter how the initial partitioning length is an integer multiple of the preset block side length.

In some implementations of the present disclosure, when a device for partitioning a point cloud partitions slices along a longest edge, it only needs to determine a partitioning length of each partitioning along the longest edge, then take partitioning position information of a previous slice as a starting point, space a position of a next partitioning length in a direction away from an origin, and partition a plane parallel to other two dimensions, thereby partitioning of one slice is achieved.

It should be noted that, in some implementations of the present disclosure, a partitioning length starts from an origin of a coordinate axis where a longest edge is located, and is sequential, so that slices partitioned based on the partitioning length are also sequential. A slice closest to a far point is a first slice, and then a second slice, . . . , and an n-th slice which are in sequence backwards.

In some implementations of the present disclosure, a device for partitioning a point cloud starts from an origin of a coordinate axis where a longest edge is located, and sequentially partitions on a first side length according to a partitioning length to obtain n−1 slices of a space block. Herein, the partitioning length includes n−1 partitioning lengths. A remaining space from an (n−1)-th slice to the space block is partitioned into an n-th slice, thus n slices are obtained.

It should be noted that there are n−1 partitioning lengths here, so that starting from an origin of a coordinate axis where a longest edge is located, one partitioning length determines a partitioning position of one slice, and an n-th slice is a remaining space from an (n−1)-th slice to a space block, thus the space block is partitioned into n slices.

In some implementations of the present disclosure, partitioning of first n−1 slices performed by a device for partitioning a point cloud may be non-uniform partitioning, while any number of slices may be partitioned by ensuring that a length of a slice along a longest edge is an integer multiple of a preset block side length.

In some implementations of the present disclosure, when slices are partitioned along a longest edge, in fact, in a case where a size of a block is specified, slice partitioning may be performed in units of a side length of the block, that is, a part of blocks are selected as one slice for a purpose of optimal rate distortion.

It may be understood that in a process of encoding point cloud data to be encoded, when a device for partitioning a point cloud uses a longest edge to perform slice partitioning, it uses an integral multiple of a preset block side length as a partitioning length to perform slice partitioning. During encoding, in a case where slice partitioning is performed along the longest edge, vertex coordinates on an edge of a preset block only belong to a same slice when performing triangle patch fitting in a preset block, which eliminates a problem that a triangle soup structure in a preset block located at a position where slices are adjacent to each other is interrupted, so that an inner surface of the preset block is continuous, a sampling point may be obtained, and gaps of slices after geometry reconstruction is eliminated, thus improving quality of encoding. In addition, when a bitstream encoded based on the above-mentioned slice partitioning is decoded, a length of a slice along a longest edge in a point cloud model obtained by decoding and reconstruction is also an integer multiple of a preset block side length, so a problem of gaps between adjacent slices will not occur during reconstruction, thus improving quality of decoding.

Figure 14:
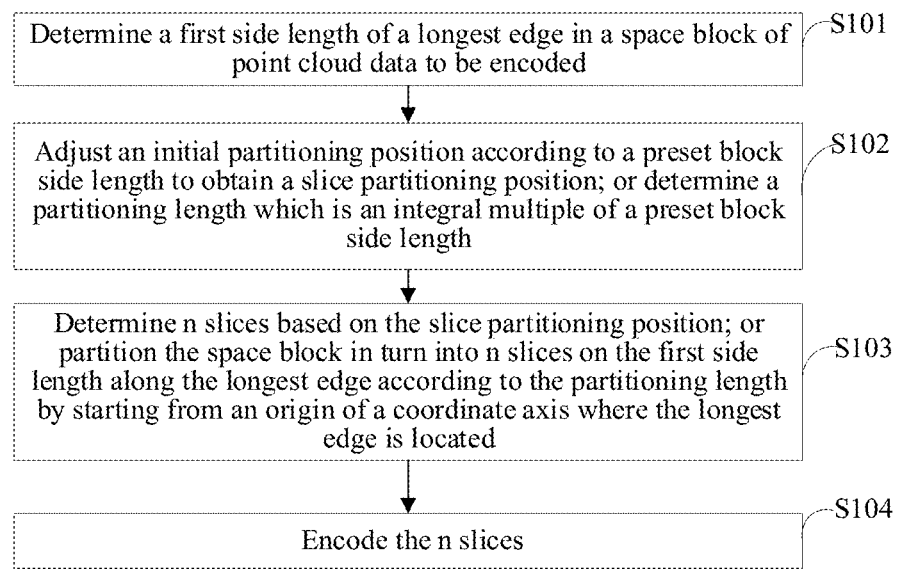
FIG. 14 is a first flowchart of a method for partitioning a point cloud further according to an implementation of the present disclosure.

Based on an idea of the above implementation, as shown in FIG. 14, an implementation of the present disclosure further provides a method for partitioning a point cloud, which may include acts S101-S104.

In S101, a first side length of a longest edge in a space block of point cloud data to be encoded is determined.

In S102, an initial partitioning position is adjusted according to a preset block side length to obtain a slice partitioning position, or a partitioning length which is an integral multiple of a preset block side length is determined.

In S103, n slices are determined based on the slice partitioning position; or, the space block is partitioned in turn into n slices on the first side length along the longest edge according to the partitioning length by starting from an origin of a coordinate axis where the longest edge is located; wherein a length of first n−1 slices along the longest edge is an integer multiple of the preset block side length, n is a quantity of partitioned slices, and n is a positive integer greater than or equal to 2.

In S104, then slices are encoded.

In the act S101, based on three-dimensional coordinates corresponding to a point in point cloud data to be encoded, a device for partitioning a point cloud may search for maximum and minimum values of a component in three dimensions of x, y, and z and find a longest edge from the corresponding maximum and minimum values in the three dimensions, so as to obtain a side length of the longest edge, i.e. a first side length.

Exemplarily, a device for partitioning a point cloud finds a maximum value and a minimum value of a component among many component values in three dimensions of x, y, and z, that is $\{x_{max}, x_{min}\}$, $\{y_{max}, y_{min}\}$ and $\{z_{max}, z_{min}\}$, and determines a first side length maxEdge=max$\{\max\{x_{max}, y_{max}\}, z_{max}\}$ of a longest edge maxEdgeAxis with a largest value from $x_{max}$, $y_{max}$, and $z_{max}$.

It should be noted that, in the implementation of the present disclosure, a space occupied by point cloud data in a three-dimensional space is here understood as a space block of the point cloud data. That is to say, the space block here may be understood as a space composed based on a maximum value and a minimum value of a component.

Figure 15:
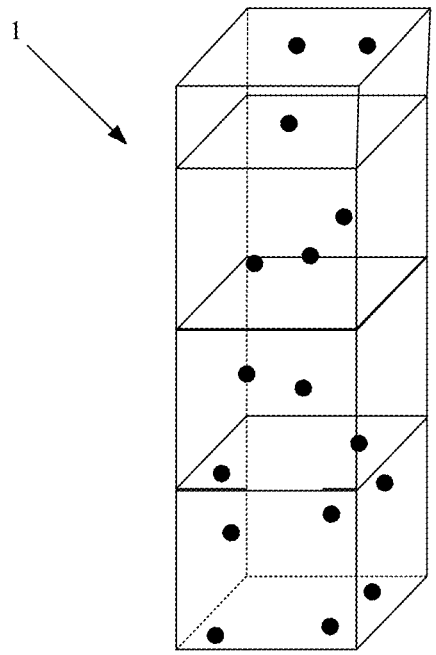
FIG. 15 is a schematic diagram of an exemplary space block according to an implementation of the present disclosure.

Exemplarily, as shown in FIG. 15, a space block of point cloud data to be encoded is indicated by 1 in the figure.

In the act S102, in order to make a length of first n−1 slices along a longest edge be an integer multiple of a preset block side length, a device for partitioning a point cloud may achieve this by adjusting an initial partitioning position or by adjusting a partitioning length.

In the implementation of the present disclosure, in a process of performing slice partitioning along a longest edge for a point cloud, a device for partitioning the point cloud may acquire a preset configuration parameter, namely trisoup_node_size_log2. When performing partitioning of a preset block, i.e., a block, a preset block side length is determined based on the preset configuration parameter.

In some implementations of the present disclosure, a preset block side length is trisoup_node_size_log2 power of 2, that is, a side length of a block is $W=2^{trisoup\_node\_size\_log2}$.

In the implementation of the present disclosure, a device for partitioning a point cloud adjusts an initial partitioning position according to a preset block side length to obtain a slice partitioning position, or uses an integer multiple of a preset block side length as a partitioning length.

It should be noted that a device for partitioning a point cloud may partition a space block along a longest edge for many times until the space block is partitioned into n slices. A specific quantity of n is determined based on an actual partitioning situation, and an n-th slice is often a last remaining block, and its partitioning length is a slice whose remaining length along the longest edge after partitioning of an (n−1)-th slice is completed, may be a non-integer multiple of a preset block side length. However, a case that a space block in point cloud data to be encoded is exactly partitioned through a partitioning length which is an integral multiple of the preset block side length, is not excluded.

In some implementations of the present disclosure, a partitioning length refers to a length interval when n−1 slices are partitioned along a longest edge. The partitioning length here is collectively referred to. Herein, n is a positive integer greater than or equal to 2.

It should be noted that the n partitioning lengths included in a partitioning length may be equal in length, unequal in length, partially equal in length, or partially unequal in length, which is specifically determined according to an actual partitioning mode, and is not limited in the implementation of the present disclosure.

In some implementations of the present disclosure, a specific multiple of an integer multiple of a preset block side length is not limited, which may be 1 or more, and may be determined during an actual processing, or the integer multiple of the preset block side length may be determined for a purpose of optimizing rate distortion, or may be a multiple determined based on consideration of encoding performance.

In the act S103, after a device for partitioning a point cloud obtains a slice partitioning position, n slices are determined based on the slice partitioning position. Or, a space block may be sequentially partitioned on a first side length along a longest edge according to a partitioning length from an origin of a coordinate axis where the longest edge is located after the partitioning length is determined, and the space block is partitioned into n slices.

In some implementations of the present disclosure, when a device for partitioning a point cloud partitions slices along a longest edge, it only needs to determine a partitioning length of each partitioning along the longest edge, then take a partitioning position of a previous slice as a starting point, space a position of a next partitioning length in a direction away from an origin, and partition a plane parallel to other two dimensions, thereby partitioning of one slice is achieved.

It should be noted that, in some implementations of the present disclosure, a partitioning length starts from an origin of a coordinate axis where a longest edge is located, and is sequential, so that slices partitioned based on the partitioning length are also sequential. A slice closest to a far point is a first slice, and then a second slice, . . . , and an n-th slice which are in sequence backwards.

In some implementations of the present disclosure, a device for partitioning a point cloud starts from an origin of a coordinate axis where a longest edge is located, and sequentially partitions on a first side length according to a partitioning length to obtain n−1 slices of a space block. Herein, the partitioning length includes n−1 partitioning lengths. A remaining space from an (n−1)-th slice to the space block is partitioned into an n-th slice, thus n slices are obtained.

It should be noted that there are n−1 partitioning lengths here, so that starting from an origin of a coordinate axis where a longest edge is located, one partitioning length determines a partitioning position of one slice, and an n-th slice is a remaining space from an (n−1)-th slice to a space block, thus the space block is partitioned into n slices.

Figure 16:
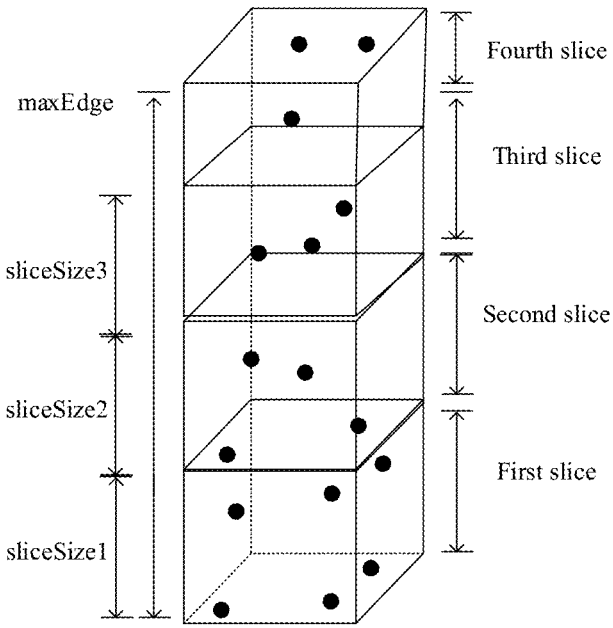
FIG. 16 is a fifth schematic diagram of an exemplary slice partitioning according to an implementation of the present disclosure.

Exemplarily, as shown in FIG. 16, it is assumed that a first side length is maxEdge, and partitioning lengths are sliceSize1, sliceSize2, and sliceSize3, wherein sliceSize1, sliceSize2, and sliceSize3 are each a length of a block side. A device for partitioning a point cloud partitions a space block into four slices, namely a first slice, a second slice, a third slice, and a fourth slice.

In the act S104, after obtaining n slices, the device for partitioning the point cloud may perform geometry encoding and attribute encoding processing on a slice, thus completing encoding of point cloud data to be encoded, and finally encoded data is signalled in a bitstream and transmitted to a decoding end for decoding of a corresponding bitstream, thereby restoring a three-dimensional picture model represented by the point cloud data.

It may be understood that, since in a process of encoding point cloud data to be encoded by a device for partitioning a point cloud, when using a longest edge for slice partitioning, the device for partitioning the point cloud uses an integer multiple of a preset block side length as a partitioning length for partitioning a space block in which the point cloud data is located along the longest edge, or the device for partitioning the point cloud adjusts an initial partitioning position such that the slice partitioning position to be used finally contains an integer multiple of a preset block side length, to obtain n−1 slices, each of which with a partitioning length being an integer multiple of the preset block side length, then, during encoding, in a case of using a longest edge for slice partitioning, when performing triangle patch fitting in a preset block, vertex coordinates on an edge of a preset block only belong to a same one slice, which eliminates a problem that a triangle soup structure in a preset block located at a position where slices are adjacent to each other is interrupted, so that an inner surface of the preset block is continuous, a sampling point may be obtained, and gaps of slices after geometry reconstruction are eliminated, thus improving quality of encoding. In addition, when a bitstream encoded based on the above-mentioned slice partitioning is decoded, a length of a slice along a longest edge in a point cloud model obtained by decoding and reconstruction is also an integer multiple of a preset block side length, so a problem of gaps between adjacent slices will not occur during reconstruction, thus improving quality of decoding.

Figure 17:
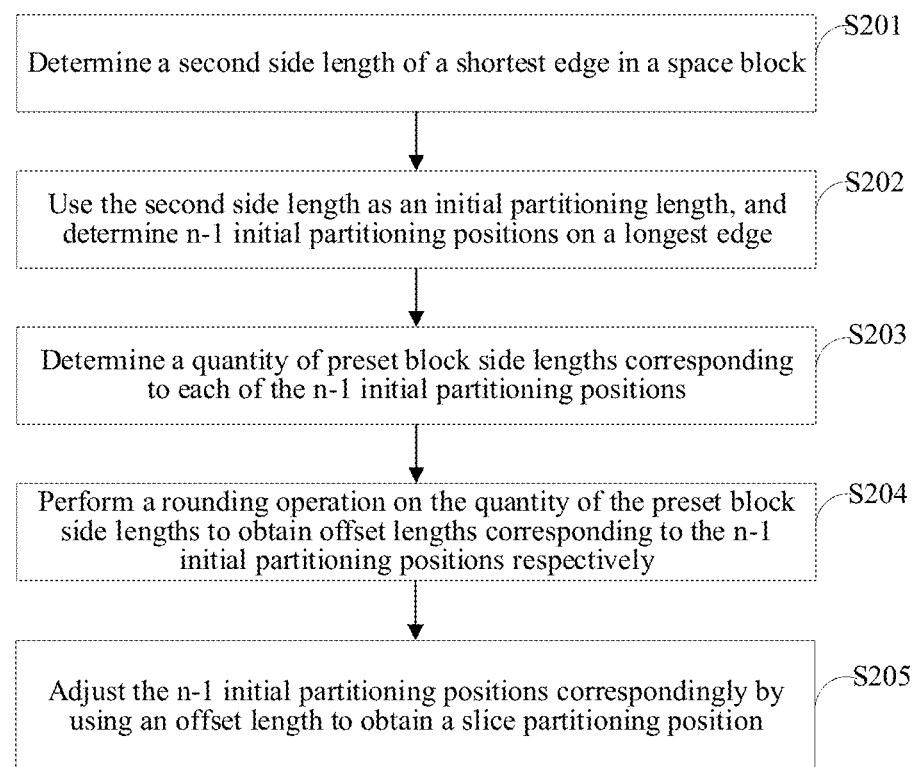
FIG. 17 is a second flowchart of a method for partitioning a point cloud further according to an implementation of the present disclosure.

As shown in FIG. 17, in a method for partitioning a point cloud according to an implementation of the present disclosure, implementation of adjusting the initial partitioning position according to the preset block side length to obtain the slice partitioning position in the act S102 may include acts S201-S205, which are as follows.

In S201, a second side length of a shortest edge in a space block is determined.

In some implementations of the present disclosure, when determining a longest edge, a device for partitioning a point cloud may further search for maximum and minimum values of a component in three dimensions of x, y, and z and find a smallest value among minimum values from corresponding maximum and minimum values of the three dimensions respectively, that is, to find a shortest edge, so as to obtain a side length of the shortest edge, i.e. a length of the shortest edge is a second side length.

Exemplarily, a device for partitioning a point cloud finds a maximum value and a minimum value of a component among many component values in three dimensions of x, y, and z, that is $\{x_{max}, x_{min}\}$, $\{y_{max}, y_{min}\}$, and $\{z_{max}, z_{min}\}$, and determines a second side length maxEdge=min$\{$min$\{x_{min}, y_{min}\}, z_{min}\}$ of a longest edge minEdgeAxis with a largest value from $x_{min}, y_{min}$, and $z_{min}$.

In S202, the second side length is used as an initial partitioning length and n−1 initial partitioning positions on a longest edge are determined.

In the implementation of the present disclosure, after acquiring the second side length, a point cloud device may use the second side length as an initial partitioning length, then use the initial partitioning length as a partitioning interval, and perform partitioning in turn on a longest edge to obtain n−1 initial partitioning positions. Among them, n−1 initial partitioning lengths are consistent.

It should be noted that, in the implementation of the present disclosure, an initial partitioning length of a device for partitioning a point cloud may also be determined based on other methods, and each initial partitioning length may be the same, different, or partially the same, all of which are determined based on actual partitioning, which are not limited in the implementation of the present disclosure.

In S203, a quantity of preset block side lengths corresponding to an initial partitioning position of the n−1 initial partitioning positions is determined.

In the implementation of the present disclosure, for n−1 initial partitioning positions, it is determined how many block side lengths that an initial partitioning position may correspond to, that is, a quantity of preset block side lengths corresponding to an initial partitioning position of the n−1 initial partitioning positions is obtained.

Among them, an initial partitioning position of the n−1 initial partitioning positions is divided by a preset block side length to obtain a corresponding quantity of preset block side lengths.

It should be noted that in the implementation of the present disclosure, determinations of a quantity of preset block side lengths corresponding to an initial partitioning position of n−1 initial partitioning positions among the n initial partitioning positions are all processing of numerical values in a direction of a longest edge.

Exemplarily, for one initial partitioning position, a process of acquiring a quantity $n_B$ of blocks contained along a longest edge is following formula (1).

$$n_B = C_p / \text{blockSize} \quad (1)$$

In which, $C_p$ is one initial partitioning position, blockSize is a preset block side length.

It should be noted that $n_B$ here may be an integer or a non-integer. $C_p$ needs to be adjusted when $n_B$ is a non-integer, and the implementations of the present disclosure are all implemented based on a fact that $n_B$ is a non-integer.

In S204, a rounding operation is performed on the quantity of the preset block side lengths to obtain offset lengths corresponding to the n−1 initial partitioning positions respectively.

In the implementation of the present disclosure, a device for partitioning a point cloud performs a rounding operation on a quantity of preset block side lengths for a case where the quantity of the preset block side lengths is a non-integer, so as to obtain offset lengths corresponding to the n−1 initial partitioning positions respectively.

Here, the offset lengths are adjustment amounts of the n−1 initial partitioning positions, wherein an initial partitioning position of the n−1 initial partitioning positions corresponds to its own offset.

It should be noted that there may be multiple rounding methods adopted by a device for partitioning a point cloud, which will be described in more detail in following implementations.

In S205, the n−1 initial partitioning positions are adjusted correspondingly by using offset lengths to obtain slice partitioning positions.

In the implementation of the present disclosure, corresponding n−1 initial partitioning positions are adjusted based on offset lengths so that adjusted slice partitioning positions are all integral multiples of a preset block side length, thus obtaining a partitioning length which is an integral multiple of the preset block side length.

Exemplarily, when performing slice partitioning, a device for partitioning a point cloud first uses a slice partitioning method along a longest edge to obtain an initial partitioning position of slice partitioning. Second, it determines whether a block is truncated at a slice partitioning position, that is, determines whether an initial partitioning position of a slice is an integer multiple of a block side length. If a quantity of block side lengths contained in a slice on the longest edge is not an integer, an offset is added to the initial partitioning position, so that the slice may contain $n_B$ nearest integer number of block side lengths on the longest edge.

In some implementations of the present disclosure, after the act S202, a way in which the device for partitioning the point cloud obtains the slice partitioning positions may further include: performing remainder operation on the n−1 initial partitioning positions to obtain n−1 remainders; when there is a first remainder which is not zero among the n−1 remainders, an initial partitioning position corresponding to the first remainder is not adjusted; when there is a second remainder which is zero among the n−1 remainders, using the second remainder as an offset length of an initial partitioning position corresponding to the second remainder; adjusting the initial partitioning position corresponding to the second remainder by using the offset length, so that the initial partitioning position corresponding to the second remainder contains an integer multiple of the preset block side length. Finally, the device for partitioning the point cloud takes the initial partitioning position corresponding to the first remainder and an adjusted initial partitioning position corresponding to the second remainder as the slice partitioning positions, and determines n slices by using the slice partitioning positions.

Figure 18:
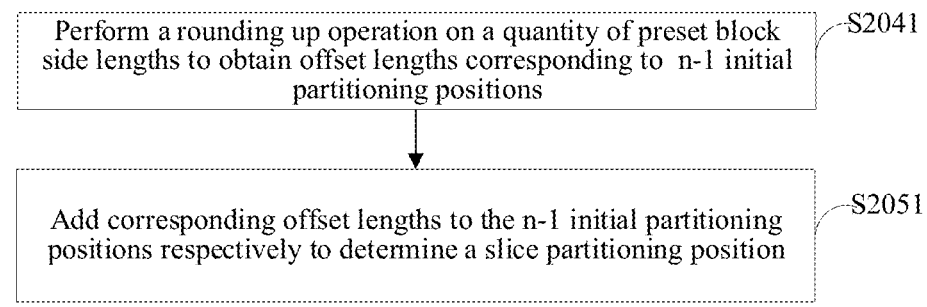
FIG. 18 is a third flowchart of a method for partitioning a point cloud further according to an implementation of the present disclosure.

Based on FIG. 17, as shown in FIG. 18, in a method for partitioning a point cloud according to an implementation of the present disclosure, implementation of performing the rounding operation on the quantity of the preset block side lengths to obtain the offset lengths corresponding to the n−1 initial partitioning positions respectively in the act S204 may include an act S2041, and implementation of the act S205 may include an act S2051, which are as follows.

In S2041, a rounding up operation is performed on a quantity of preset block side lengths to obtain offset lengths corresponding to n−1 initial partitioning positions respectively.

In S2051, the n−1 initial partitioning positions are added with corresponding offset lengths respectively to determine slice partitioning positions.

In the implementation of the present disclosure, a rounding operation on a quantity of preset block side lengths by a device for partitioning a point cloud may be a rounding up operation, so that a deviation from a rounding result, i.e., an offset length, is obtained. Since it is achieved by rounding up, it means that an initial partitioning position of n−1 initial partitioning positions is too small, thus it is necessary to add a corresponding offset length to an initial partitioning position of the n−1 initial partitioning positions, so as to determine a slice partitioning position, that is, a partitioning position which is an integer multiple of a preset block side length.

Herein, for a case where the quantity of the preset block side lengths is a non-integer, the device for partitioning the point cloud performs a rounding up operation on the quantity of the preset block side lengths, so that one slice may contain $\lceil n_B \rceil$ side lengths of blocks on a longest edge, wherein $\lceil \ \rceil$ indicates rounding up.

As shown in FIG. 6, $n_B$ corresponding to a length slice p of an initial partitioning position is 2.6. at this time, 2.6 is rounded up to obtain an offset length of 0.4, and an offset is added to the initial partitioning position to obtain a slice partitioning position, and one slice is partitioned based on $n_B=3$ of slice p.

Figure 19:
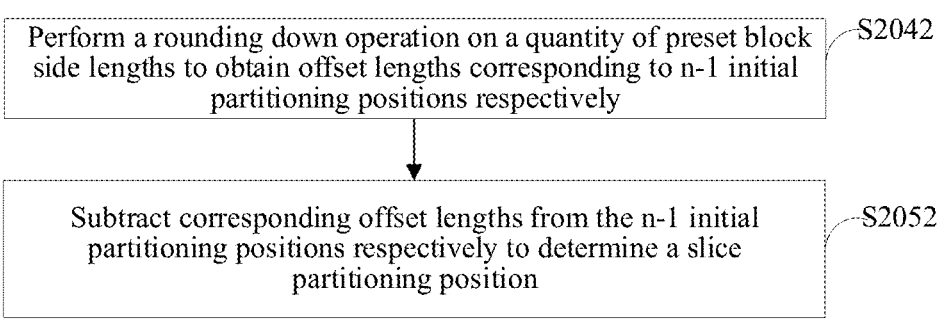
FIG. 19 is a fourth flowchart of a method for partitioning a point cloud further according to an implementation of the present disclosure.

Based on FIG. 17, as shown in FIG. 19, in a method for partitioning a point cloud according to an implementation of the present disclosure, implementation of performing the rounding operation on the quantity of the preset block side lengths to obtain the offset lengths corresponding to the first n−1 initial partitioning positions respectively in the act S204 may include an act S2041, and implementation of S205 may include an act S2052, which are as follows.

In S2042, a rounding down operation is performed on a quantity of preset block side lengths to obtain offset lengths corresponding to n−1 initial partitioning positions respectively.

In S2052, corresponding offset lengths are subtracted from the n−1 initial partitioning positions respectively to determine slice partitioning positions.

In the implementation of the present disclosure, a rounding operation on a quantity of preset block side lengths by a device for partitioning a point cloud may be a rounding down operation, so that a deviation from a rounding result, i.e., an offset length, is obtained. Since it is achieved by rounding down, it means that an initial partitioning position of n−1 initial partitioning positions is too large, thus it is necessary to subtract a corresponding offset length from an initial partitioning position of the n−1 initial partitioning positions, so as to determine a slice partitioning position, that is, a partitioning position which is an integer multiple of a preset block side length.

Herein, for a case where the quantity of the preset block side lengths is a non-integer, the device for partitioning the point cloud performs a rounding down operation on the quantity of the preset block side lengths, so that one slice may contain $\lfloor n_B \rfloor$ side lengths of blocks on a longest edge, wherein $\lfloor \ \rfloor$ indicates rounding down.

As shown in FIG. 7, $n_B$ corresponding to a length slice p of an initial partitioning position is 2.6. At this time, 2.6 is rounded down to obtain an offset length of 0.6, and an offset is subtracted from the initial partitioning position to obtain a partitioning length, and one slice is partitioned based on $n_B=2$ of slice p.

Figure 20:
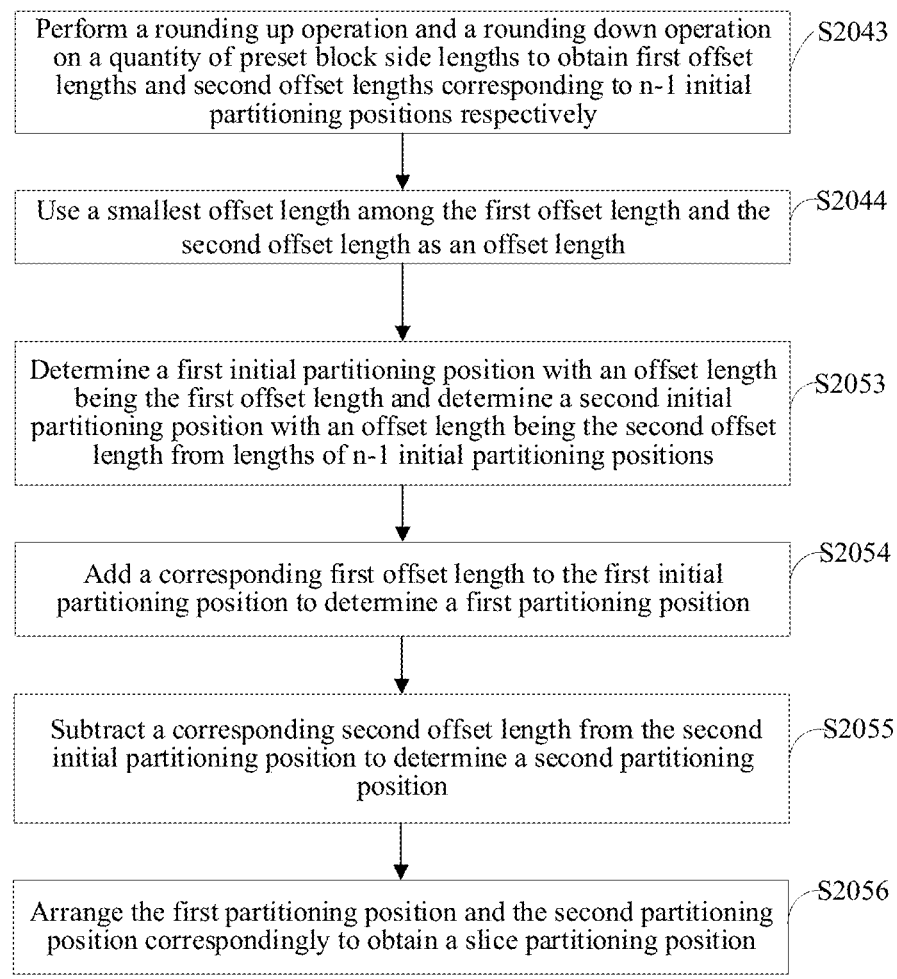
FIG. 20 is a fifth flowchart of a method for partitioning a point cloud further according to an implementation of the present disclosure.

Based on FIG. 17, as shown in FIG. 20, in a method for partitioning a point cloud according to an implementation of the present disclosure, implementation of performing the rounding operation on the quantity of the preset block side lengths to obtain the offset lengths corresponding to the n−1 initial partitioning positions respectively in the act S204 may include acts S2043-S2044, and implementation of S205 may include acts S2053-S2056, which are as follows.

In S2043, a rounding up operation and a rounding down operation are performed on a quantity of preset block side lengths to obtain first offset lengths and second offset lengths corresponding to n−1 initial partitioning positions respectively.

In S2044, a smallest offset length among the first offset length and the second offset length is used as an offset length.

In the implementation of the present disclosure, a rounding operation on a quantity of preset block side lengths by a device for partitioning a point cloud may be a rounding operation of rounding to a nearest whole number, so that a deviation from a rounding result, that is, an offset length, is obtained.

Specifically, a device for partitioning a point cloud performs operations of rounding up and rounding down on a quantity of preset block side lengths to obtain first offset lengths and second offset lengths corresponding to the n−1 initial partitioning positions respectively, and uses a smallest offset length among the first offset length and the second offset length as an offset length. Therefore, since the first offset length is obtained by rounding up and the second offset length is obtained by rounding down, if the first offset length is used as the offset length, it is necessary to add the first offset length to an initial partitioning position, and if the second offset length is used as the offset length, it is necessary to subtract the second offset length from an initial partitioning position, so as to obtain a slice partitioning position.

In S2053, a first initial partitioning position with an offset length being the first offset length and a second initial partitioning position with an offset length being the second offset length are determined from offset lengths of n−1 initial partitioning positions.

In S2054, a corresponding first offset length is added to the first initial partitioning position to determine a first partitioning position.

In S2055, a corresponding second offset length is subtracted from the second initial partitioning position to determine a second partitioning position.

In S2056, the first partitioning position and the second partitioning position are arranged correspondingly to obtain a slice partitioning position.

In the implementation of the present disclosure, since there may be a case where a corresponding first offset length is an offset length among n−1 initial partitioning positions, and there may be a case where a corresponding second offset length is an offset length among n−1 initial partitioning positions, it is necessary to determine a first initial partitioning position with an offset length being a first offset length and/or a second initial partitioning position with an offset length being a second offset length among the n−1 initial partitioning positions.

Among them, the first initial partitioning position and the second initial partitioning position are collectively referred to, and a quantity of them is not limited, which may be obtained through actual determination.

In this way, a first partitioning position is determined by adding a corresponding first offset length to a first initial partitioning position. A second partitioning position is determined by subtracting a corresponding second offset length from a second initial partitioning position. Finally, the first partitioning position and the second partitioning position are arranged correspondingly to obtain a slice partitioning position, which is a partitioning position that is an integer multiple of a preset block side length.

It should be noted that initial partitioning positions are sequential, and finally obtained slice partitioning positions are also obtained based on a corresponding sequence, which is consistent with a sequence of n−1 slices.

Exemplarily, when adjusting a slice partitioning position, an operation of rounding up an integer number of block side lengths is modified to shifting to a direction with a smaller offset during adjusting. A first offset length is s1 and a second offset length is s2, so when s1<s2, as shown in FIG. 8, a slice size becomes slice p+s1, and when s2<s1, as shown in FIG. 9, a slice size becomes slice p−s2.

Figure 21:
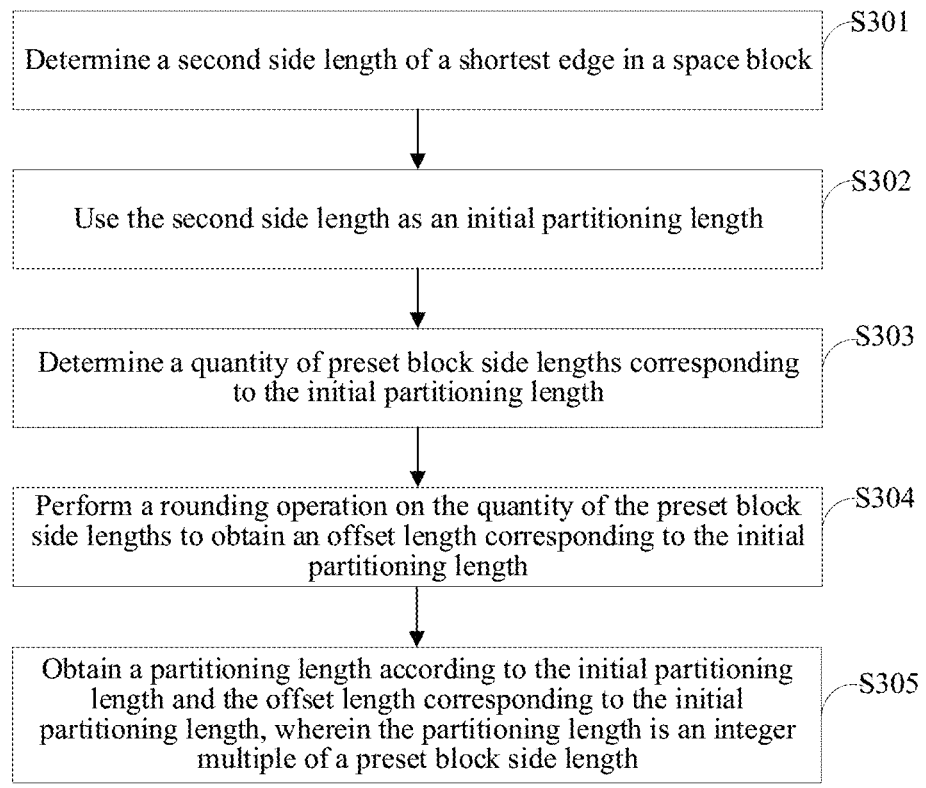
FIG. 21 is a sixth flowchart of a method for partitioning a point cloud further according to an implementation of the present disclosure.

As shown in FIG. 21, in a method for partitioning a point cloud according to an implementation of the present disclosure, implementation of determining the partitioning length which is an integral multiple of the preset block side length in the act S102 may include acts S301-S306, which are as follows.

In S301, a second side length of a shortest edge in a space block is determined.

In S302, the second side length is used as an initial partitioning length.

In S303, a quantity of preset block side lengths corresponding to the initial partitioning length is determined.

In S304, a rounding operation is performed on the quantity of the preset block side lengths to obtain an offset length corresponding to the initial partitioning length.

In S305, a partitioning length is obtained according to the initial partitioning length and the offset length corresponding to the initial partitioning length, wherein the partitioning length is an integer multiple of a preset block side length.

In the implementation of the present disclosure, based on a same principle as that of the implementation of acts S201-S205, first n−1 initial partitioning lengths determined by a device for partitioning a point cloud are all consistent with a second side length, so the device for partitioning the point cloud only performs rounding adjustment on one initial partitioning length so that next n−2 partitioning lengths are consistent with a first partitioning length. Among them, a principle of rounding adjustment for one initial partitioning length is the same as that of the implementation of acts S201-S205, which will not be repeated here.

In some implementations of the present disclosure, a device for partitioning a point cloud may also determine a partitioning length by performing remainder operation, an implementation process is as follows: the device for partitioning the point cloud determines a second side length of a shortest edge in a space block, uses the second side length as an initial partitioning length, performs remainder operation on the initial partitioning length to obtain a remainder; uses the initial partitioning length as the partitioning length when the remainder is zero; uses the remainder as an offset length when the remainder is not zero; and subtracts the offset length from the initial partitioning length to obtain the partitioning length, or, subtracts the offset length from the initial partitioning length and adding a preset block side length to obtain the partitioning length.

It should be noted that in the implementation of the present disclosure, a device for partitioning a point cloud may perform slice partitioning on point cloud data along a longest edge according to a length of a second side length. Here, after initial partitioning, the device for partitioning the point cloud may adjust an initial partitioning length (the second side length) to achieve a purpose that the initial partitioning length is an integer multiple of a preset block side length. The device for partitioning the point cloud may make adjustments in two ways, one way is to directly divide the initial partitioning length by the preset block side length to obtain a quantity of preset block side lengths, and round the quantity of the preset block side lengths to obtain an offset length, and adjust the initial partitioning length to be an integer multiple of the preset block side length through the offset length. A specific rounding method is consistent with the rounding method of the previous implementations, including rounding up, rounding down, and rounding to a nearest whole number, etc., which are not limited in the implementation of the present disclosure, and a corresponding adjustment method is also consistent with an adjustment principle of the previous implementations, which will not repeated here. Another way is to directly perform remainder operation on the initial partitioning length, determine whether the initial partitioning length is an integer multiple of a preset block side length by determining whether the remainder is zero. If the initial partitioning length is an integer multiple of the preset block side length, the initial partitioning length remains unchanged. If the initial partitioning length is not an integer multiple of the preset block side length, the remainder is used as an offset length for adjusting the initial partitioning length, and the remainder may be directly subtracted from the initial partitioning length, or after the remainder is subtracted from the initial partitioning length, a preset integer multiple of the preset block side length is added, no matter how the initial partitioning length is an integer multiple of the preset block side length.

In some implementations of the present disclosure, a device for partitioning a point cloud may adjust a part of initial partitioning lengths in n−1 initial partitioning lengths based on an offset length, and then allocate partitioning lengths corresponding to other unadjusted initial partitioning lengths based on adjusted part of initial partitioning lengths. A quantity of the part of initial partitioning lengths and a specific implementation strategy of allocating other unadjusted initial partitioning lengths based on adjusted part of initial partitioning lengths are not limited in the implementation of the present disclosure, as long as they are reasonable.

Figure 22:
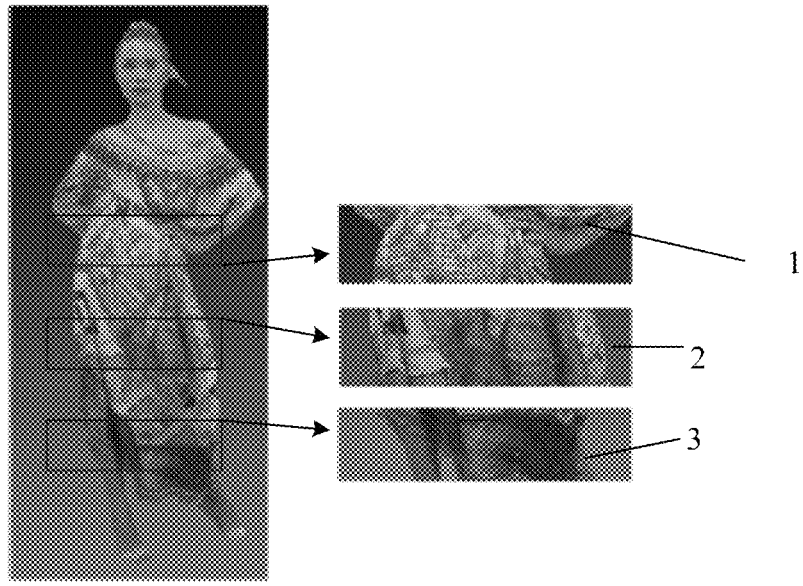
FIG. 22 is a first schematic diagram of an exemplary point cloud model according to an implementation of the present disclosure.

Exemplarily, for a longdress point cloud model, aiming at a problem that a reconstruction effect of a point cloud obtained by a slice partitioning method along a longest edge in the prior art shown in FIG. 4 is not good, a reconstruction effect of a three-dimensional picture obtained by adopting a method for partitioning a point cloud according to an implementation of the present disclosure is as shown in FIG. 22. It may be seen from FIG. 22 that a problem of gaps in reconstruction in regions 1, 2, and 3 has been eliminated, and quality of encoding and decoding has been improved.

The following is a result of an intuitive comparison between the method in the prior art and the method according to the present disclosure based on a comparison of objective quality metric Peak Signal to Noise Ratio (PSNR) for reconstruction of a longdress point cloud model, which is as shown in Table 1. The larger a PSNR value is, the higher quality of a reconstructed point cloud is.

TABLE 1

|  | Color PSNR (dB) | | | Geometric PSNR (dB) |
| --- | --- | --- | --- | --- |
|  | Y | U | V | D1 |
| Prior art | 30.3894 | 39.0809 | 37.4364 | 58.735 |
| The present disclosure | 30.8958 | 39.7228 | 38.3715 | 59.8278 |
| Gain (%) | 1.667 | 2.134 | 2.498 | 1.861 |

It may be seen from the Table 1 that whether for a color PSNR or a geometric PSNR, compared with implementation in the prior art, the present disclosure has positive gains of 1.667%, 2.134%, 2.498%, and 1.861%. The numerical values show that quality of encoding and decoding is significantly improved by using the present disclosure.

Figure 23:
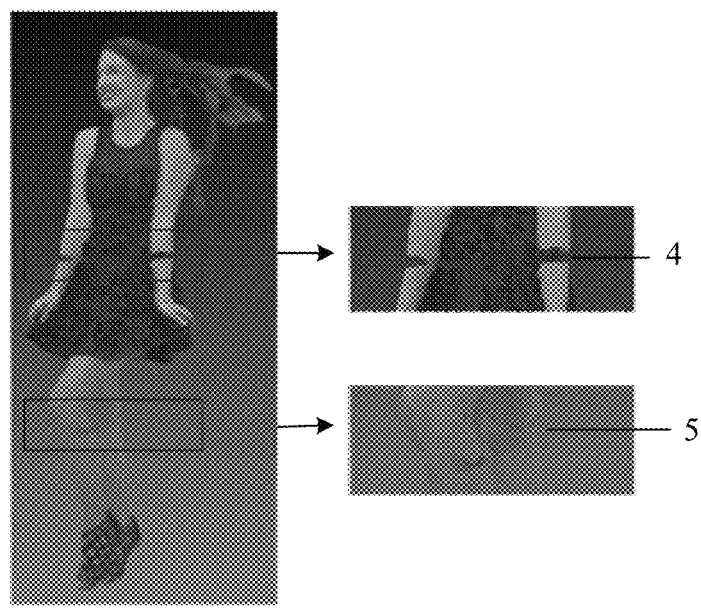
FIG. 23 is a second schematic diagram of an exemplary existing point cloud model according to an implementation of the present disclosure.
Figure 24:
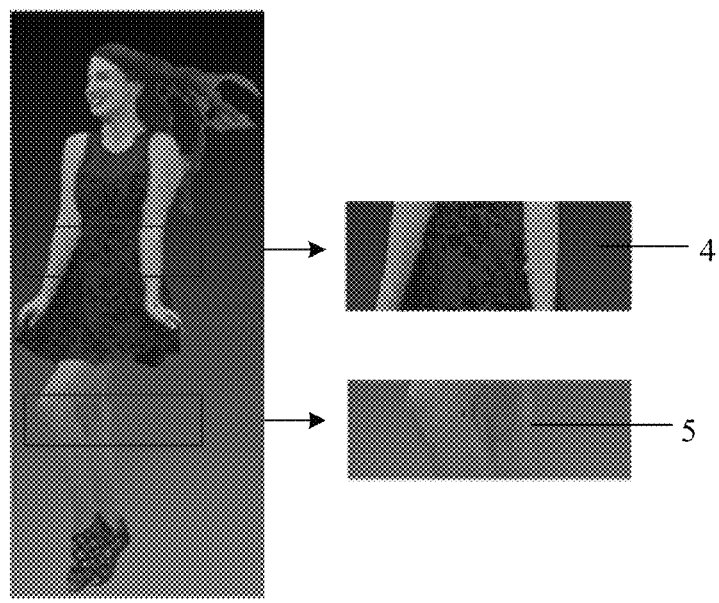
FIG. 24 is a second schematic diagram of an exemplary point cloud model according to an implementation of the present disclosure.

Exemplarily, for a redandblack point cloud model, aiming at a problem that a reconstruction effect of a point cloud obtained by a slice partitioning method along a longest edge in the prior art shown in FIG. 23 is not good, a reconstruction effect of a three-dimensional picture obtained by adopting a method for partitioning a point cloud according to an implementation of the present disclosure is as shown in FIG. 24. It may be seen from comparison between FIG. 24 and FIG. 23 that a problem of gaps in reconstruction in regions 4 and 5 has been eliminated, and quality of encoding and decoding has been improved.

The following is a result of an intuitive comparison between the method in the prior art and the method according to the present disclosure based on a comparison of objective quality metric Peak Signal to Noise Ratio (PSNR) for reconstruction of a redandblack point cloud model, which is as shown in Table 2. The larger a PSNR value is, the higher quality of a reconstructed point cloud is.

TABLE 2

|  | Color PSNR (dB) | | | Geometric PSNR (dB) |
| --- | --- | --- | --- | --- |
|  | Y | U | V | D1 |
| Prior art | 36.2011 | 43.494 | 36.5211 | 58.5868 |
| The present disclosure | 36.3411 | 43.539 | 37.1926 | 59.0357 |
| Gain (%) | 0.387 | 0.103 | 1.839 | 0.766 |

It may be seen from the Table 2 that whether for a color PSNR or a geometric PSNR, compared with implementation in the prior art, the present disclosure has positive gains of 0.387%, 0.103%, 0.103%, and 0.766%. The numerical values show that quality of encoding and decoding is significantly improved by using the present disclosure.

It may be understood that, no matter which rounding method is adopted, a device for partitioning a point cloud achieves that a space block where point cloud data is located is partitioned along a longest edge by taking an integral multiple of a preset block side length as a partitioning length, thus obtaining n−1 slices, each of which with a partitioning length being an integral multiple of the preset block side length. Then, during encoding, in a case of using the longest edge for slice partitioning, when performing triangle patch fitting in a preset block, vertex coordinates on an edge of a preset block only belong to a same one slice, which eliminates a problem that a triangle soup structure in a preset block located at a position where slices are adjacent to each other is interrupted, so that an inner surface of the preset block is continuous, a sampling point may be obtained, and gaps of slices after geometry reconstruction are eliminated, thus improving quality of encoding. In addition, when a bitstream encoded based on the above-mentioned slice partitioning is decoded, a length of a slice along a longest edge in a point cloud model obtained by decoding and reconstruction is also an integer multiple of a preset block side length, so a problem of gaps between adjacent slices will not occur during reconstruction, thus improving quality of decoding.

Based on realization of the foregoing implementations, an implementation of the present disclosure provides a device for partitioning a point cloud, which includes: a partitioning part configured to adjust an initial partitioning position or determine a slice partitioning length according to a size of a preset block to obtain a slice partitioning position when slice partitioning is performed along a longest edge, wherein a length of first n−1 slices along the longest edge is an integer multiple of a preset block side length, n is a quantity of partitioned slices, and n is a positive integer greater than or equal to 2.

Figure 25:
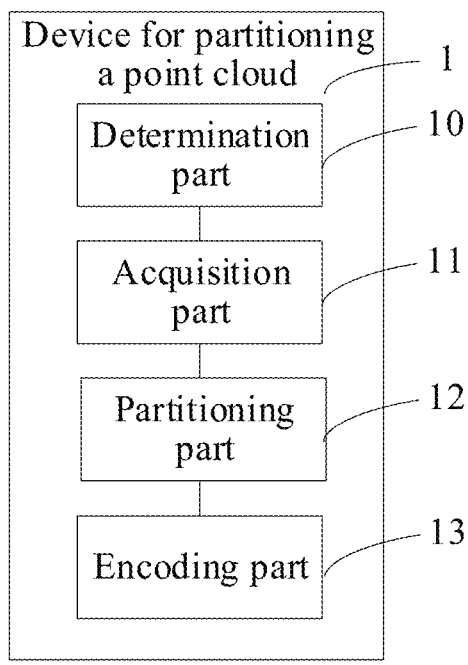
FIG. 25 is a first structural diagram of a device for partitioning a point cloud according to an implementation of the present disclosure.

Based on realization of the foregoing implementations, as shown in FIG. 25, an implementation of the present disclosure further provides a device 1 for partitioning a point cloud, which includes: a determination part 10 configured to determine a first side length of a longest edge in a space block of point cloud data to be encoded, and adjust an initial partitioning position according to a preset block side length to obtain a slice partitioning position; or determine a partitioning length which is an integer multiple of a preset block side length; a partitioning part 12 configured to determine n slices based on the slice partitioning position; or, partition the space block in turn into n slices on the first side length along the longest edge according to the partitioning length by starting from an origin of a coordinate axis where the longest edge is located; wherein a length of first n−1 slices along the longest edge is an integer multiple of the preset block side length, n is a quantity of partitioned slices, and n is a positive integer greater than or equal to 2; and an encoding part 13 configured to encode the n slices.

In the above device, the device further includes an acquisition part 11; the determination part 10 is further configured to determine a second side length of a shortest edge in the space block; determine n−1 initial partitioning positions on the longest edge by taking the second side length as an initial partitioning length; and determine a quantity of preset block side lengths corresponding to an initial partitioning position of the n−1 initial partitioning positions.

The acquisition part 11 is further configured to obtain offset lengths corresponding to the n−1 initial partitioning positions respectively by rounding the quantity of the preset block side lengths.

The determination part 10 is further configured to correspondingly adjust the n−1 initial partitioning positions by using offset lengths to obtain slice partitioning positions.

In the above device, the acquisition part 11 is further configured to obtain the offset lengths corresponding to the n−1 initial partitioning positions respectively by rounding up the quantity of the preset block side lengths.

The determination part 10 is further configured to add the corresponding offset lengths to the n−1 initial partitioning positions respectively to determine the slice partitioning positions.

In the above device, the acquisition part 11 is further configured to obtain the offset lengths corresponding to the n−1 initial partitioning positions respectively by rounding down the quantity of the preset block side lengths.

The determination part 10 is further configured to subtract the corresponding offset lengths from the n−1 initial partitioning positions respectively to determine the slice partitioning positions.

In the above device, the acquisition part 11 is further configured to performs operations of rounding up and rounding down on the quantity of the preset block side lengths to obtain first offset lengths and second offset lengths corresponding to the n−1 initial partitioning positions respectively, and use a smallest offset length among the first offset lengths and the second offset lengths as the offset length.

The determination part 10 is further configured to determine a first initial partitioning position with the offset length being the first offset length and determine a second initial partitioning position with the offset length being the second offset length from the n−1 initial partitioning positions; add the corresponding first offset length to the first initial partitioning position to determine a first partitioning position; subtract the corresponding second offset length from the second initial partitioning position to determine a second partitioning position; and arrange the first partitioning position and the second partitioning position correspondingly to obtain the slice partitioning position.

In the above device, the acquisition part 11 is further configured to perform remainder operation on the n−1 initial partitioning positions to obtain n−1 remainders after the second side length is used as the initial partitioning length and the n−1 initial partitioning positions on the longest edge are determined; configured not to adjust an initial partitioning position corresponding to a first remainder when the first remainder which is not zero exists among the n−1 remainders; configured to use the second remainder as an offset length of an initial partitioning position corresponding to a second remainder when the second remainder which is zero exists among the n−1 remainders; adjust the initial partitioning position corresponding to the second remainder by using the offset length, so that the initial partitioning position corresponding to the second remainder contains an integer multiple of the preset block side length.

In the above device, the determination part 10 is further configured to determine a second side length of a shortest edge in the space block; use the second side length as an initial partitioning length; and determine a quantity of preset block side lengths corresponding to the initial partitioning length.

The acquisition part 11 is further configured to perform a rounding operation on the quantity of the preset block side lengths to obtain an offset length corresponding to the initial partitioning length; and obtain the partitioning length according to the initial partitioning length and the offset length corresponding to the initial partitioning length; wherein the partitioning length is an integer multiple of the preset block side length.

In the above device, the acquisition part 11 is further configured to perform remainder operation on the initial partitioning length to obtain a remainder after the second side length is used as the initial partitioning length; use the initial partitioning length as the partitioning length when the remainder is zero; use the remainder as an offset length when the remainder is not zero; subtract the offset length from the initial partitioning length to obtain the partitioning length; or subtract the offset length from the initial partitioning length and add a preset block side length to obtain the partitioning length.

In the above device, the partitioning part 12 is further configured to sequentially perform partitioning on the first side length along the longest edge according to the partitioning length to obtain n−1 slices of the space block by starting from an origin of a coordinate axis where the longest edge is located, wherein the partitioning length includes n−1 partitioning lengths; and partition a remaining space from an (n−1)-th slice to the space block into an n-th slice, so as to obtain the n slices.

Figure 26:
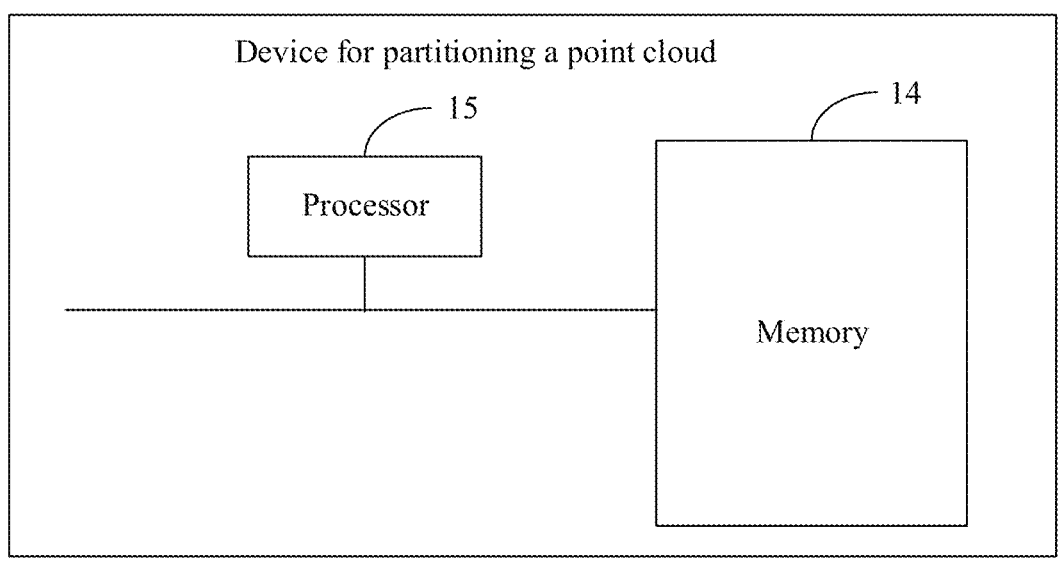
FIG. 26 is a second structural diagram of a device for partitioning a point cloud according to an implementation of the present disclosure.

In an actual application, as shown in FIG. 26, an implementation of the present disclosure further provides a device for partitioning a point cloud, which includes: a memory 14 configured to store executable point cloud partitioning instructions; and a processor 15 configured to implement the method for partitioning a point cloud according to the implementations of the present disclosure when executing the executable point cloud partitioning instructions stored in the memory 14.

The processor 15 may be implemented by software, hardware, firmware, or a combination thereof, and may use circuits, one or more application specific integrated circuits (ASIC), one or more general integrated circuits, one or more microprocessors, one or more programmable logic devices, or a combination of the aforementioned circuits or devices, or other suitable circuits or devices, so that the processor 15 may implement corresponding acts of the method for partitioning a point cloud in the aforementioned implementations of the measurement platform.

It may be understood that since in a process of encoding point cloud data to be encoded, when a device for partitioning a point cloud uses a longest edge to perform slice partitioning, whether an initial partitioning position is adjusted or an initial partitioning length is adjusted, it is all for a purpose of partitioning a space block where the point cloud data is located along the longest edge by using an integer multiple of a preset block side length as a partitioning length, thus obtaining n−1 slices, each of which with a partitioning length being an integer multiple of the preset block side length, then, during encoding, in a case of using the longest edge for slice partitioning, when performing triangle patch fitting in a preset block, vertex coordinates on an edge of a preset block only belong to a same one slice, which eliminates a problem that a triangle soup structure in a preset block located at a position where slices are adjacent to each other is interrupted, so that an inner surface of the preset block is continuous, a sampling point may be obtained, and gaps of slices after geometry reconstruction are eliminated, thus improving quality of encoding. In addition, when a bitstream encoded based on the above-mentioned slice partitioning is decoded, a length of a slice along a longest edge in a point cloud model obtained by decoding and reconstruction is also an integer multiple of a preset block side length, so a problem of gaps between adjacent slices will not occur during reconstruction, thus improving quality of decoding.

Various constituent parts in the implementations of the present disclosure may be integrated in one processing unit, or various units may be physically present separately, or two or more units may be integrated in one unit. The integrated units may be implemented in a form of hardware, or may be implemented in a form of a software functional module.

The integrated unit, if implemented in the form of a software functional module and sold or used as an independent product, may be stored in a computer readable storage medium. Based on such understanding, the technical solutions of the present disclosure, in essence, or a part contributing to the prior art, or all or part of the technical solutions, may be embodied in a form of a software product, the computer software product is stored in a storage medium, and includes several instructions for enabling a computer device (which may be a personal computer, a server, or a network device, etc.) or a processor to perform all or part of the acts of the methods in the implementations. The aforementioned storage medium may be various media that may store program codes, such as a ferromagnetic random access memory (FRAM), a Read Only Memory (ROM), a Programmable Read-Only Memory (PROM), an Erasable Programmable Read-Only Memory (EPROM), an Electrically Erasable Programmable Read-Only Memory (EEPROM), a Flash Memory, a magnetic surface memory, a compact disk, or a Compact Disc Read-Only Memory (CD-ROM), which is not limited in the implementations of the present disclosure.

An implementation of the present disclosure provides a computer readable storage medium in which executable point cloud partitioning instructions are stored, and when the executable point cloud partitioning instructions are executed by a processor, the method for partitioning a point cloud according to the implementations of the present disclosure is implemented.

INDUSTRIAL APPLICABILITY

The implementations of the present disclosure provides a method and device for partitioning a point cloud, and a computer readable storage medium, including: when slice partitioning is performed along a longest edge, an initial partitioning position is adjusted or a partitioning length of a slice is determined according to a size of a preset block, so as to obtain a slice partitioning position. In this way, in a process of encoding point cloud data to be encoded, when using a longest edge for slice partitioning, a device for partitioning a point cloud takes into account a preset block side length (a size of a preset block) for slice partitioning to achieve partitioning a space block in which the point cloud data is located along the longest edge, and a length of an obtained slice partitioned along the longest edge contains an integer multiple of the preset block side length. Then, during encoding, in a case of using the longest edge for slice partitioning, when triangle patch fitting is performed in a preset block, vertex coordinates on an edge of a preset block only belong to a same slice, which eliminates a problem that a triangle soup structure in a preset block located at a position where slices are adjacent to each other is interrupted, so that an inner surface of the preset block is continuous, a sampling point may be obtained, and gaps of slices after geometry reconstruction are eliminated, thus improving quality of encoding. In addition, when a bitstream encoded based on the above-mentioned slice partitioning is decoded, a length of a slice along a longest edge in a point cloud model obtained by decoding and reconstruction is also an integer multiple of a preset block side length, so a problem of gaps between adjacent slices will not occur during reconstruction, thus improving quality of decoding.

What is claimed is:

1. A method for partitioning a point cloud, comprising:
adjusting an initial partitioning position or determining a slice partitioning length according to a size of a preset block to obtain a slice partitioning position when performing slice partitioning along a longest edge, wherein a length of first n−1 slices along the longest edge is an integer multiple of a preset block side length, n is a quantity of partitioned slices, and n is a positive integer greater than or equal to 2.

2. The method of claim 1, wherein adjusting the initial partitioning position or determining the slice partitioning length according to the size of the preset block to obtain the slice partitioning position when performing slice partitioning along the longest edge comprises:
adjusting information of the initial partitioning position according to the preset block side length when performing the slice partitioning along the longest edge to obtain slice partitioning position information; or
determining the slice partitioning length according to the preset block side length to obtain slice partitioning position information.

3. The method of claim 2, wherein adjusting information of the initial partitioning position according to the preset block side length to obtain the slice partitioning position information comprises:
determining a first side length of the longest edge and a second side length of a shortest edge in a space block of point cloud data to be encoded;
performing slice partitioning along the longest edge with the second side length as a partitioning length, and determining information of n−1 initial partitioning positions on the longest edge;
determining whether information of an i-th initial partitioning position is an integer multiple of the preset block side length, wherein i is greater than or equal to 1 and less than n;
determining an offset length based on a quantity of preset block side lengths contained in the information of the i-th initial partitioning position along the first side length when the information of the i-th initial partitioning position is a non-integer multiple of the preset block side length; and
adjusting the information of the i-th initial partitioning position based on the offset length to obtain information of an i-th slice partitioning position, and continuing to obtain information of an (i+1)-th initial partitioning position until information of an (n−1)-th initial partitioning position is acquired, to obtain the slice partitioning position information, wherein the slice partitioning position information contains an integer number of preset block side lengths.

4. The method of claim 3, wherein determining whether the information of the i-th initial partitioning position is an integer multiple of the preset block side length comprises:
dividing the information of the i-th initial partitioning position by the preset block side length respectively to obtain a quantity of contained preset block side lengths;
determining that the information of the i-th initial partitioning position corresponding to the quantity of the preset block side lengths is a non-integer multiple of the preset block side length when the quantity of the preset block side lengths is not an integer; and
determining that the information of the i-th initial partitioning position corresponding to the quantity of the contained preset block side lengths is an integer multiple of the preset block side length when the quantity of the preset block side lengths is an integer.

5. The method of claim 3, wherein determining the offset length based on the quantity of the preset block side lengths contained in the information of the i-th initial partitioning position along the first side length comprises:
performing a rounding operation on the quantity of the preset block side lengths to obtain an offset length corresponding to the information of the i-th initial partitioning position.

6. The method of claim 5, wherein performing the rounding operation on the quantity of the preset block side lengths to obtain the offset length corresponding to the information of the i-th initial partitioning position comprises:
performing a rounding up operation on the quantity of the preset block side lengths to obtain the offset length corresponding to the information of the i-th initial partitioning position.

7. The method of claim 6, wherein adjusting the information of the i-th initial partitioning position based on the offset length to obtain the slice partitioning position information comprises:
adding the offset length to the information of the i-th initial partitioning position to obtain information of an i-th slice partitioning position, and continuing to obtain information of an (i+1)-th initial partitioning position until information of an (n−1)-th initial partitioning position is acquired, to obtain the slice partitioning position information.

8. The method of claim 5, wherein performing the rounding operation on the quantity of the preset block side lengths to obtain the offset length corresponding to the information of the i-th initial partitioning position comprises:
performing a rounding down operation on the quantity of the preset block side lengths to obtain the offset length corresponding to the information of the i-th initial partitioning position.

9. The method of claim 8, wherein adjusting the information of the i-th initial partitioning position based on the offset length to obtain the slice partitioning position information comprises:
subtracting the offset length from the information of the i-th initial partitioning position to obtain the information of the i-th slice partitioning position, and continuing to obtain information of an (i+1)-th initial partitioning position until information of an (n−1)-th initial partitioning position is acquired, to obtain the slice partitioning position information.

10. The method of claim 5, wherein performing the rounding operation on the quantity of the preset block side lengths to obtain the offset length corresponding to the information of the i-th initial partitioning position comprises:
performing a rounding up operation on the quantity of the preset block side lengths to obtain a first offset length corresponding to the information of the i-th initial partitioning position;
performing a rounding down operation on the quantity of the preset block side lengths to obtain a second offset length corresponding to the information of the i-th initial partitioning position; and
using a minimum length of the first offset length and the second offset length as the offset length.

11. The method of claim 10, wherein adjusting the information of the i-th initial partitioning position based on the offset length to obtain the slice partitioning position information comprises:
subtracting the offset length from the information of the i-th initial partitioning position to obtain the information of the i-th slice partitioning position when the offset length is the first offset length, and continuing to obtain information of an (i+1)-th initial partitioning position until information of an (n−1)-th initial partitioning position is acquired, to obtain the slice partitioning position information; and
adding the offset length to the information of the i-th initial partitioning position to obtain the information of the i-th slice partitioning position when the offset length is the second offset length, and continuing to obtain information of an (i+1)-th initial partitioning position until information of an (n−1)-th initial partitioning position is acquired, to obtain the slice partitioning position information.

12. The method of claim 3, wherein determining whether the information of the i-th initial partitioning position is an integer multiple of the preset block side length comprises:
performing remainder operation on the preset block side length according to the information of the i-th initial partitioning position to obtain a remainder;
using the remainder as an offset length when the remainder is not zero; and
using the information of the i-th initial partitioning position as information of an i-th slice partitioning position when the remainder is zero.

13. The method of claim 12, wherein after using the remainder as the offset length, the method further comprises:
subtracting the offset length from the information of the i-th initial partitioning position to obtain the information of the i-th slice partitioning position; or, subtracting the offset length from the information of the i-th initial partitioning position and adding the preset block side length to obtain the information of the i-th slice partitioning position; and
continuing to obtain information of an (i+1)-th initial partitioning position until information of an (n−1)-th initial partitioning position is acquired, to obtain the slice partitioning position information.

14. The method of claim 2, wherein determining the slice partitioning length according to the preset block side length to obtain the slice partitioning position information comprises:
determining the preset block side length based on a preset configuration parameter;
using an integral multiple of the preset block side length as a partitioning length; and
performing partitioning in turn on the first side length along the longest edge according to the partitioning length by starting from an origin of a coordinate axis where the longest edge is located, to obtain the slice partitioning position information.

15. The method of claim 14, wherein using the integral multiple of the preset block side length as the partitioning length comprises:
determining a second side length of a shortest edge in the space block;
using the second side length as an initial partitioning length;
determining a quantity of preset block side lengths corresponding to the initial partitioning length;
performing a rounding operation on the quantity of the preset block side lengths to obtain an offset length corresponding to the initial partitioning length; and
adjusting the initial partitioning length based on the offset length to obtain a partitioning length.

16. The method of claim 15, wherein after using the second side length as the initial partitioning length, the method further comprises:
performing remainder operation on the initial partitioning length to obtain a remainder;
using the initial partitioning length as the partitioning length when the remainder is zero;
using the remainder as an offset length when the remainder is not zero; and
subtracting the offset length from the initial partitioning length to obtain the partitioning length; or, subtracting the offset length from the initial partitioning length and adding the preset block side length to obtain the partitioning length.

17. A method for partitioning a point cloud, comprising:
determining a first side length of a longest edge in a space block of point cloud data to be encoded;
adjusting an initial partitioning position according to a preset block side length to obtain a slice partitioning position; or, determining a partitioning length which is an integral multiple of the preset block side length;
determining n slices based on the slice partitioning position; or, partitioning the space block in turn into n slices on the first side length along the longest edge according to the partitioning length by starting from an origin of a coordinate axis where the longest edge is located; wherein a length of first n−1 slices along the longest edge is an integer multiple of the preset block side length, n is a quantity of partitioned slices, and n is a positive integer greater than or equal to 2; and
encoding the n slices.

18. The method of claim 17, wherein adjusting the initial partitioning position according to the preset block side length to obtain the slice partitioning position comprises:
determining a second side length of a shortest edge in the space block;
using the second side length as an initial partitioning length, and determining n−1 initial partitioning positions on the longest edge;
determining a quantity of preset block side lengths corresponding to an initial partitioning position of the n−1 initial partitioning positions;
performing a rounding operation on the quantity of the preset block side lengths to obtain offset lengths corresponding to the n−1 initial partitioning positions respectively; and
adjusting the n−1 initial partitioning positions correspondingly by using the offset lengths to obtain slice partitioning positions.

19. The method of claim 18, wherein performing the rounding operation on the quantity of the preset block side lengths to obtain the offset lengths corresponding to the n−1 initial partitioning positions respectively comprises:
performing a rounding up operation on the quantity of the preset block side lengths to obtain the offset lengths corresponding to the n−1 initial partitioning positions respectively; and
accordingly, adjusting the n−1 initial partitioning positions correspondingly by using the offset lengths to obtain the slice partitioning positions comprises:
adding the corresponding offset lengths to the n−1 initial partitioning positions respectively to determine the slice partitioning positions.

20. A device for partitioning a point cloud, comprising:
a memory configured to store executable point cloud partitioning instructions; and
a processor configured to adjust an initial partitioning position or determine a slice partitioning length according to a size of a preset block to obtain a slice partitioning position when performing slice partitioning along a longest edge, wherein a length of first n−1 slices along the longest edge is an integer multiple of a preset block side length, n is a quantity of partitioned slices, and n is a positive integer greater than or equal to 2.

* * * * *